United States Patent
Wang

(10) Patent No.: US 11,272,168 B2
(45) Date of Patent: Mar. 8, 2022

(54) THREE-DIMENSIONAL DISPLAY APPARATUS, THREE-DIMENSIONAL IMAGING APPARATUS, AND METHOD OF DISPLAYING THREE-DIMENSIONAL IMAGE

(71) Applicant: BOE Technology Group Co., Ltd., Beijing (CN)

(72) Inventor: Wei Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 364 days.

(21) Appl. No.: 16/474,269

(22) PCT Filed: Jul. 16, 2018

(86) PCT No.: PCT/CN2018/095798
§ 371 (c)(1),
(2) Date: Jun. 27, 2019

(87) PCT Pub. No.: WO2020/014820
PCT Pub. Date: Jan. 23, 2020

(65) Prior Publication Data
US 2021/0337179 A1 Oct. 28, 2021

(51) Int. Cl.
*H04N 13/307* (2018.01)
*H04N 13/354* (2018.01)

(52) U.S. Cl.
CPC ......... *H04N 13/307* (2018.05); *H04N 13/354* (2018.05)

(58) Field of Classification Search
USPC ........................................................ 348/51
See application file for complete search history.

(56) References Cited

U.S. PATENT DOCUMENTS 9,224,366 B1 12/2015 Park et al.
2011/0234770 A1* 9/2011 Zerrouk ............... H04N 13/305
348/51

(Continued)

FOREIGN PATENT DOCUMENTS

CN 102879912 A 1/2013
CN 103995359 A 8/2014

(Continued)

OTHER PUBLICATIONS

International Search Report & Written Opinion dated Apr. 24, 2019, regarding PCT/CN2018/095798.

(Continued)

*Primary Examiner* — Behrooz M Senfi
(74) *Attorney, Agent, or Firm* — Intellectual Valley Law, P.C.

(57) ABSTRACT

The present application provides a three-dimensional display apparatus for providing a plurality of view points to a view zone. The three-dimensional display apparatus includes a display panel configured to display a plurality of first sub-images respectively in a plurality of display sub-regions and display a plurality of second sub-images respectively in the plurality of display sub-regions; a main lens configured to focus each of the plurality of first sub-images to a first view point and focus each of the plurality of second sub-images to a second view point; a plurality of first light sources configured to provide back light for the display panel to respectively display the plurality of first sub-images, and a plurality of second light sources configured to provide back light for the display panel to respectively display the plurality of second sub-images.

18 Claims, 16 Drawing Sheets

(56) References Cited

U.S. PATENT DOCUMENTS

| | | | | |
|---|---|---|---|---|
| 2011/0267438 A1* | 11/2011 | Yang | ............. | H04N 13/334 348/51 |
| 2012/0139908 A1* | 6/2012 | Choi | ............. | H04N 13/312 345/419 |
| 2014/0133020 A1* | 5/2014 | Woodgate | ............. | G02B 30/24 359/462 |
| 2014/0233100 A1* | 8/2014 | Sato | ............. | G02B 30/27 359/463 |
| 2015/0304645 A1* | 10/2015 | Wilson | ............. | G06F 3/012 348/51 |
| 2018/0003995 A1* | 1/2018 | Bui | ............. | H04N 13/32 |
| 2019/0004324 A1* | 1/2019 | Wang | ............. | G02B 5/1819 |
| 2019/0243149 A1* | 8/2019 | Iguchi | ............. | G02B 30/00 |
| 2020/0103582 A1* | 4/2020 | Fattal | ............. | G02F 1/133606 |

FOREIGN PATENT DOCUMENTS

| | | | |
|---|---|---|---|
| CN | 104618706 A | | 5/2015 |
| CN | 105374325 A | | 3/2016 |
| CN | 108107598 A | | 6/2018 |
| CN | 109073905 A | | 12/2018 |

OTHER PUBLICATIONS

Banks, M., et al., "Conflicting Focus Cues in Stereoscopic Displays", Information Display, Jul. 2008.

* cited by examiner

THREE-DIMENSIONAL DISPLAY APPARATUS, THREE-DIMENSIONAL IMAGING APPARATUS, AND METHOD OF DISPLAYING THREE-DIMENSIONAL IMAGE

CROSS-REFERENCE TO RELATED APPLICATION

This application is a national stage application under 35 U.S.C. § 371 of International Application No. PCT/CN2018/095798, filed Jul. 16, 2018, the contents of which are incorporated by reference in the entirety.

TECHNICAL FIELD

The present invention relates to display technology, more particularly, to a three-dimensional display apparatus for providing a plurality of view points to a view zone, a three-dimensional imaging apparatus for providing a plurality of view zones to a left eye and a right eye respectively, and a method of displaying a three-dimensional image using a three-dimensional display apparatus for providing a plurality of view points to a view zone.

BACKGROUND

Various three-dimensional display systems have been developed. Examples of three-dimensional display systems include a parallax barrier system, liquid crystal shutter glasses, polarized glasses, or the like. For displaying a three-dimensional image, typically an image for the left eye and an image for the right eye are displayed on a display panel. A viewer, using the three-dimensional display system such as a parallax barrier system, is able to view the image for the left eye by his/her left eye, and view the image for the light eye by her right eye, thereby perceiving a three-dimensional image.

SUMMARY

In one aspect, the present invention provides a three-dimensional display apparatus for providing a plurality of view points to a view zone, comprising a display panel configured to display a plurality of first sub-images respectively in a plurality of display sub-regions and display a plurality of second sub-images respectively in the plurality of display sub-regions, the plurality of first sub-images and the plurality of second sub-images being displayed in a first time sequential order so that a respective one of the plurality of first sub-images and a respective one of the plurality of second sub-images displayed in a same one of the plurality of display sub-regions are displayed at different time points; a main lens between the display panel and the view zone, and configured to focus each of the plurality of first sub-images to a first view point and focus each of the plurality of second sub-images to a second view point, thereby displaying a three-dimensional image, the first view point and the second view point being within a same view zone, the second view point being different from the first view point; and a back light source comprising a plurality of first light sources and a plurality of second light sources, the plurality of first light sources configured to provide back light for the display panel to respectively display the plurality of first sub-images, the plurality of second light sources configured to provide back light for the display panel to respectively display the plurality of second sub-images; wherein the plurality of first light sources and the plurality of second light sources are configured to be illuminated in a second time sequential order corresponding to the first time sequential order.

Optionally, the three-dimensional display apparatus further comprises a micro-lens array between the display panel and the back light source; wherein the micro-lens array comprises a plurality of micro-lenses respectively corresponding to the plurality of display sub-regions; the plurality of first light sources are respectively approximately at focal points of the plurality of micro-lenses; the plurality of second light sources are respectively approximately at the focal points of the plurality of micro-lenses; each individual one of the plurality of micro-lenses is configured to focus back light provided by a respective one of the plurality of first light sources to a respective one of the plurality of display sub-regions thereby displaying a respective one of the plurality of first sub-images, and configured to focus back light provided by a respective one of the plurality of second light sources to the respective one of the plurality of display sub-regions thereby displaying a respective one of the plurality of second sub-images.

Optionally, each of the plurality of micro-lenses has a focal length in a range of approximately 0.1 mm to approximately 5 mm.

Optionally, the plurality of micro-lenses are arranged as an array of micro-lenses, a cross-section of each micro-lens in the array of micro-lenses has a substantially hexagonal shape.

Optionally, each of the plurality of first light sources and the plurality of second light sources comprises a first light emitting element of a first color, a second light emitting element of a second color, and a third light emitting element of a third color.

Optionally, the first light emitting element of the first color, the second light emitting element of the second color, and the third light emitting element of the third color in a respective one of the plurality of first light sources are configured to be illuminated time sequentially; and the first light emitting element of the first color, the second light emitting element of the second color, and the third light emitting element of the third color in a respective one of the plurality of second light sources are configured to be illuminated time sequentially.

Optionally, each of the plurality of first light sources and the plurality of second light sources has a size in a range of approximately 10 μm to approximately 200 μm.

Optionally, a respective one of the plurality of first sub-images and a respective one of the plurality of second sub-images corresponding to a same one of the plurality of display sub-regions are generated by two different sets of pixels in the same one of the plurality of display sub-regions, the two different sets of pixels having no pixel in common.

Optionally, the three-dimensional display apparatus further comprises a lens screen between the micro-lens array and the back light source; the lens screen has a plurality of openings configured to respectively allow light emitted from the plurality of first light sources and the plurality of second light sources to transmit there-through.

Optionally, the three-dimensional display apparatus further comprises a substantially transparent optical material layer spacing apart the micro-lens array and the back light source.

Optionally, the main lens and the display panel are spaced apart by a distance equal to or less than 5 cm.

Optionally, the same view zone is a same eye of a viewer.

Optionally, the first view point and the second view point are spaced apart by a distance no more than 2.5 mm.

Optionally, the display panel is a liquid crystal display panel.

In another aspect, the present invention provides a three-dimensional imaging apparatus for providing a plurality of view zones to a left eye and a right eye respectively, comprising a first three-dimensional display apparatus and a second three-dimensional display apparatus, each of which is a three-dimensional display apparatus described herein; wherein the first three-dimensional display apparatus is configured to focus each a plurality of first sub-images displayed by a first display panel to a first view point of the left eye and focus each a plurality of second sub-images displayed by the first display panel to a second view point of the left eye; and the second three-dimensional display apparatus is configured to focus each a plurality of first sub-images displayed by a second display panel to a first view point of the light eye and focus each a plurality of second sub-images displayed by the second display panel to a second view point of the right eye.

In another aspect, the present invention provides a method of displaying a three-dimensional image using a three-dimensional display apparatus for providing a plurality of view points to a view zone; wherein the three-dimensional display apparatus comprises a display panel configured to display a plurality of first sub-images respectively in a plurality of display sub-regions and display a plurality of second sub-images respectively in the plurality of display sub-regions; a main lens between the display panel and the view zone, and configured to focus each of the plurality of first sub-images to a first view point and focus each of the plurality of second sub-images to a second view point, thereby displaying a three-dimensional image, the first view point and the second view point being within a same view zone, the second view point being different from the first view point; a back light source comprising a plurality of first light sources and a plurality of second light sources, the plurality of first light sources configured to provide back light for the display panel to respectively display the plurality of first sub-images, the plurality of second light sources configured to provide back light for the display panel to respectively display the plurality of second sub-images; wherein the method comprises displaying the plurality of first sub-images and the plurality of second sub-images in a first time sequential order by illuminating the plurality of first light sources and the plurality of second light sources in a second time sequential order corresponding to the first time sequential order; and a respective one of the plurality of first sub-images and a respective one of the plurality of second sub-images displayed in a same one of the plurality of display sub-regions are displayed at different time points according to the first time sequential order.

Optionally, each of the plurality of first light sources and the plurality of second light sources comprises a first light emitting element of a first color, a second light emitting element of a second color, and a third light emitting element of a third color; wherein the method comprises illuminating the first light emitting element of the first color, the second light emitting element of the second color, and the third light emitting element of the third color in a respective one of the plurality of first light sources time sequentially; and illuminating the first light emitting element of the first color, the second light emitting element of the second color, and the third light emitting element of the third color in a respective one of the plurality of second light sources time sequentially.

Optionally, the three-dimensional display apparatus further comprises a micro-lens array between the display panel and the back light source; wherein the micro-lens array comprises a plurality of micro-lenses respectively corresponding to the plurality of display sub-regions; the plurality of first light sources are respectively approximately at focal points of the plurality of micro-lenses; the plurality of second light sources are respectively approximately at the focal points of the plurality of micro-lenses; wherein the method further comprises focusing back light provided by the plurality of first light sources by the plurality of micro-lenses respectively to the plurality of display sub-regions thereby displaying the plurality of first sub-images; and focusing back light provided by the plurality of second light sources by the plurality of micro-lenses respectively to the plurality of display sub-regions thereby displaying the plurality of second sub-images.

Optionally, the first time sequential order comprises displaying one or multiple of the plurality of first sub-images but none of the plurality of second sub-images at a first time point; and displaying one or multiple of the plurality of second sub-images but none of the plurality of first sub-images at a second time point; wherein the second time sequential order comprises illuminating one or multiple of the plurality of first light sources corresponding to the one or multiple of the plurality of first sub-images, but none of the plurality of second light sources at the first time point; and illuminating one or multiple of the plurality of second light sources corresponding to the one or multiple of the plurality of second sub-images, but none of the plurality of first light sources at a second time point.

Optionally, the first time sequential order comprises displaying a combination of one or multiple of the plurality of first sub-images and one or multiple of the plurality of second sub-images at a first time point; and displaying a combination of one or multiple of the plurality of second sub-images and one or multiple of the plurality of first sub-images at a second time point; wherein the second time sequential order comprises illuminating a combination of one or multiple of the plurality of first light sources corresponding to the one or multiple of the plurality of first sub-images, and one or multiple of the plurality of second light sources corresponding to the one or multiple of the plurality of second sub-images at the first time point; and illuminating a combination of one or multiple of the plurality of second light sources corresponding to the one or multiple of the plurality of second sub-images, and one or multiple of the plurality of first light sources corresponding to the one or multiple of the plurality of first sub-images at a second time point.

Optionally, the same view zone is a same eye of a viewer.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
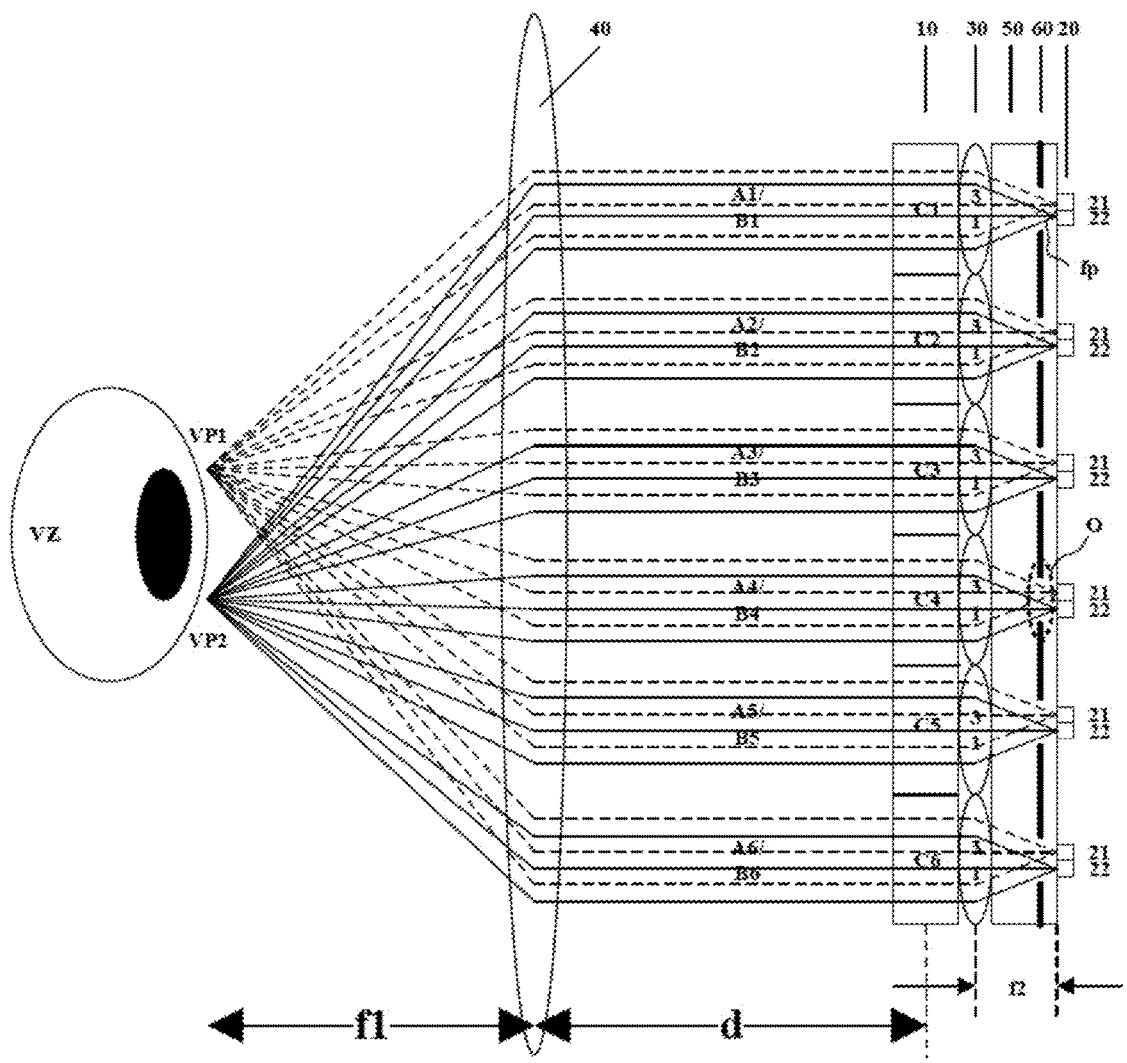
FIG. 1 is a schematic diagram illustrating the structure of a three-dimensional display apparatus for providing a plurality of view points to a view zone in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a real-life environment, when human eyes view an object at a distance, the monocular convergence position is substantially the same as the binocular convergence position, e.g., both being substantially at the object being viewed. When a viewer views a three-dimensional image using a conventional three-dimensional imaging apparatus, e.g., a parallax three-dimensional system, the display screen only provides light field information with regard to the binocular parallax image, but does not provide light field information necessary for monocular convergence, e.g., direction of light rays. Thus, in conventional three-dimensional imaging apparatuses, the monocular convergence position is always at the display screen, whereas the binocular convergence distance is at a virtual object at a distance away. The inconsistency between the monocular convergence distance and the binocular convergence distance results in viewing discomfort, such as dizziness.

Accordingly, the present disclosure provides, inter alia, a three-dimensional display apparatus for providing a plurality of view points to a view zone, a three-dimensional imaging apparatus for providing a plurality of view zones to a left eye and a right eye respectively, and a method of displaying a three-dimensional image using a three-dimensional display apparatus for providing a plurality of view points to a view zone that substantially obviate one or more of the problems due to limitations and disadvantages of the related art. In one aspect, the present disclosure provides a three-dimensional display apparatus for providing a plurality of view points to a view zone. In some embodiments, the three-dimensional display apparatus includes a display panel configured to display a plurality of first sub-images respectively in a plurality of display sub-regions and display a plurality of second sub-images respectively in the plurality of display sub-regions, the plurality of first sub-images and the plurality of second sub-images being displayed in a first time sequential order so that a respective one of the plurality of first sub-images and a respective one of the plurality of second sub-images displayed in a same one of the plurality of display sub-regions are displayed at different time points; a main lens between the display panel and the view zone, and configured to focus each of the plurality of first sub-images to a first view point and focus each of the plurality of second sub-images to a second view point, thereby displaying a three-dimensional image, the first view point and the second view point being within a same view zone, the second view point being different from the first view point; and a back light source including a plurality of first light sources and a plurality of second light sources, the plurality of first light sources configured to provide back light for the display panel to respectively display the plurality of first sub-images, the plurality of second light sources configured to provide back light for the display panel to respectively display the plurality of second sub-images. Optionally, the plurality of first light sources and the plurality of second light sources are configured to be illuminated in a second time sequential order corresponding to the first time sequential order.

FIG. 1 is a schematic diagram illustrating the structure of a three-dimensional display apparatus for providing a plurality of view points to a view zone in some embodiments according to the present disclosure. Referring to FIG. 1, the three-dimensional display apparatus in some embodiments includes a display panel 10 having a plurality of display sub-regions (e.g., C1, C2, C3, C4, C5, and C6), a main lens 40 between the display panel 10 and a view zone VZ, and a back light source 20 including a plurality of first light sources 21 and a plurality of second light sources 22. Optionally, the view zone VZ includes a plurality of view points, e.g., a first view point VP1 and a second view point VP2 as shown in FIG. 1. The plurality of first light sources 21 are configured to provide back light (depicted in dotted lines) respectively to the plurality of display sub-regions of the display panel 10, and the plurality of second light sources 22 are configured to provide back light (depicted in solid lines) respectively to the plurality of display sub-regions of the display panel 10. Each individual one of the plurality of display sub-regions corresponds to a respective one of the plurality of first light sources 21 and a respective one of the plurality of second light sources 22, e.g., the respective one of the plurality of first light sources 21 and the respective one of the plurality of second light sources 22 are configured to provide back light to a same one of the plurality of display sub-regions. Optionally, the plurality of display sub-regions are substantially non-overlapping with each other, e.g., adjacent display sub-regions of the plurality of display sub-regions do not share any subpixels in common.

In some embodiments, the display panel 10 is configured to display a plurality of first sub-images (e.g., A1, A2, A3, A4, A5, A6, . . . ) by illuminating the plurality of first light sources 21 respectively to the plurality of display sub-regions, and configured to display a plurality of second sub-images (e.g., B1, B2, B3, B4, B5, B6, . . . ) by illuminating the plurality of second light sources 22 respectively to the plurality of display sub-regions. Optionally, the plurality of first sub-images and the plurality of second sub-images are displayed in a first time sequential order. According to the first time sequential order, a respective one of the plurality of first sub-images and a respective one of the plurality of second sub-images displayed in a same one of the plurality of display sub-regions are displayed at different time points. For example, referring to FIG. 1, sub-image A1 and sub-image B1 are displayed in a same display sub-region C1, but they are displayed at different time points. The main lens 40 is configured to focus each a plurality of first sub-images displayed by the display panel 10 to the first view point VP1 and focus each a plurality of second sub-images displayed by the display panel 10 to a second view point VP2, thereby displaying a three-dimensional image.

Various appropriate display panels may be used in the present three-dimensional display apparatus. Optionally, the display panel is one that requires a back light. Optionally, the display panel is a self-emitting display panel. Examples of appropriate display panels include a liquid crystal display panel, an organic light emitting diode display panel, a micro-light emitting diode display panel, a liquid crystal on silicon display panel. Optionally, the liquid crystal display panel includes a color filter. Optionally, the liquid crystal display panel does not include a color filter, and the backlight for the liquid crystal display panel includes a plurality of light emitting elements of different colors, e.g., red, green, and blue.

As shown in FIG. 1, lights respectively emitted from a respective one of the plurality of first light sources 21 and a respective one of the plurality of second light sources 22 corresponding to a same one of the plurality of display sub-regions are transmitted at different emission angles so that a respective one of the plurality of first sub-images and a respective one of the plurality of second sub-images corresponding to the same one of the plurality of display sub-regions are respectively focused by the main lens to the first view point VP1 and the second view point VP2. For example, one of the plurality of first light sources 21 and one of the plurality of second light sources 22 corresponding to display sub-region C1 emit light at different emission angles. Sub-image A1 generated by back light provided by the one of the plurality of first light sources 21 and sub-image B1 generated by back light provided by the one of the plurality of second light sources 22 are respectively focused by the main lens to the first view point VP1 and the second view point VP2.

In some embodiments, the plurality of first light sources 21 and the plurality of second light sources 22 are configured to be illuminated in a second time sequential order corresponding to the first time sequential order. Accordingly, the display panel 10 is configured to display the plurality of first sub-images and the plurality of second sub-images in the first time sequential order. For example, a first group of sub-images and a second group of sub-images are respectively displayed in two sequential time points. Optionally, the first group of sub-images includes exclusively one or multiple of the plurality of first sub-images, and the second group of sub-images includes exclusively one or multiple of the plurality of second sub-images. Optionally, the first group of sub-images includes a combination of one or multiple of the plurality of first sub-images and one or multiple of the plurality of second sub-images, e.g., the first group of sub-images includes at least one of the plurality of first sub-images and at least one of the plurality of second sub-images. Optionally, the second group of sub-images includes a combination of one or multiple of the plurality of second sub-images and one or multiple of the plurality of first sub-images, e.g., the second group of sub-images includes at least one of the plurality of first sub-images and at least one of the plurality of second sub-images.

In some embodiments, the display panel 10 is configured to display the plurality of first sub-images and the plurality of second sub-images in a first time sequential order. For example, a first group of sub-images and a second group of sub-images are respectively displayed in two sequential time points. Optionally, the first group includes exclusively one or multiple of the plurality of first sub-images and the second group includes exclusively one or multiple of the plurality of second sub-images. Optionally, the first group includes a combination of one or multiple of the plurality of first sub-images and one or multiple of the plurality of second sub-images. Optionally, the second group includes a combination of one or multiple of the plurality of second sub-images and one or multiple of the plurality of first sub-images.

Figure 2A:
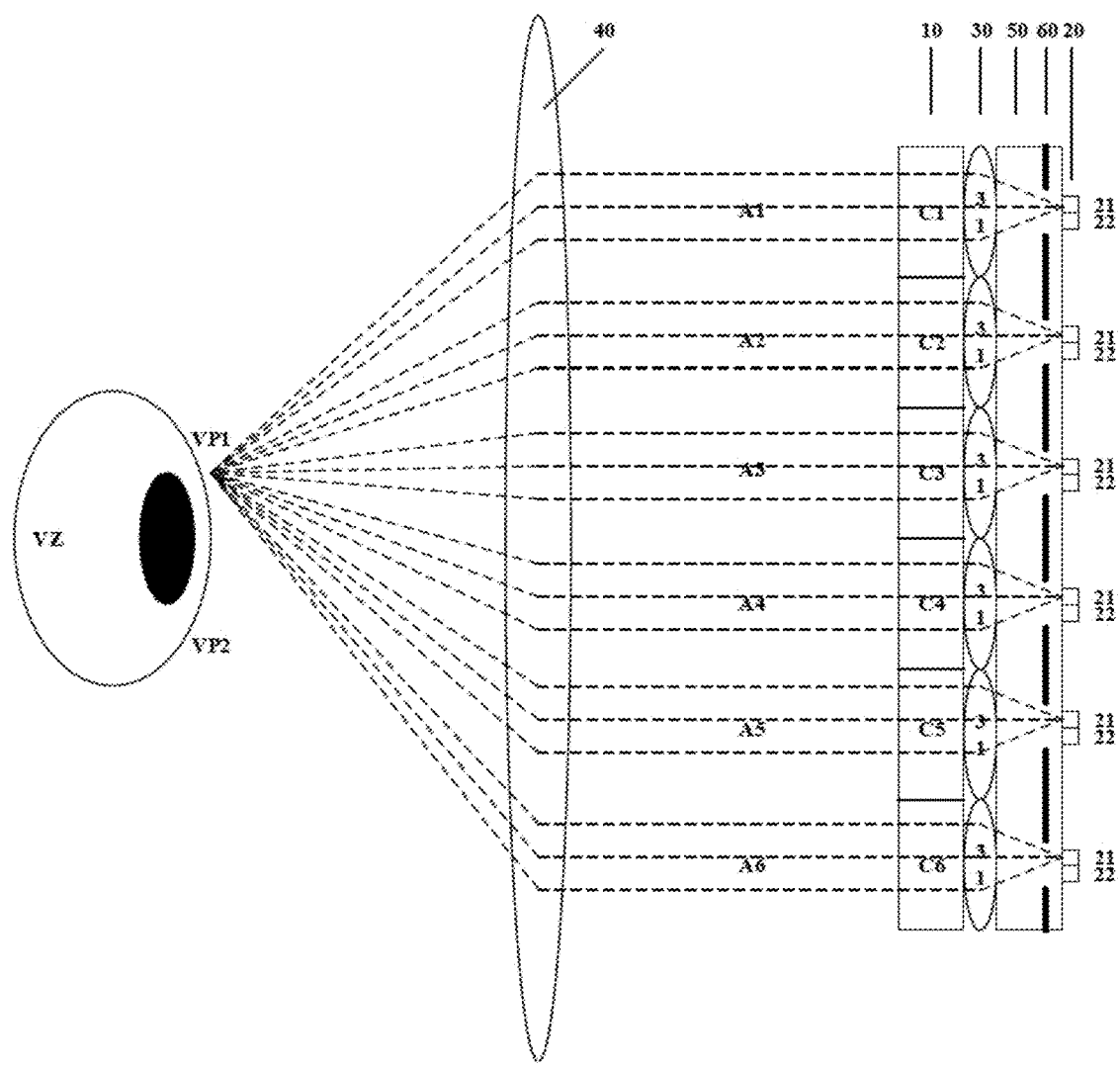
FIGS. 2A and 2B illustrate a process of displaying a three-dimensional image using a three-dimensional display apparatus for providing a plurality of view points to a view zone in some embodiments according to the present disclosure.
Figure 2B:
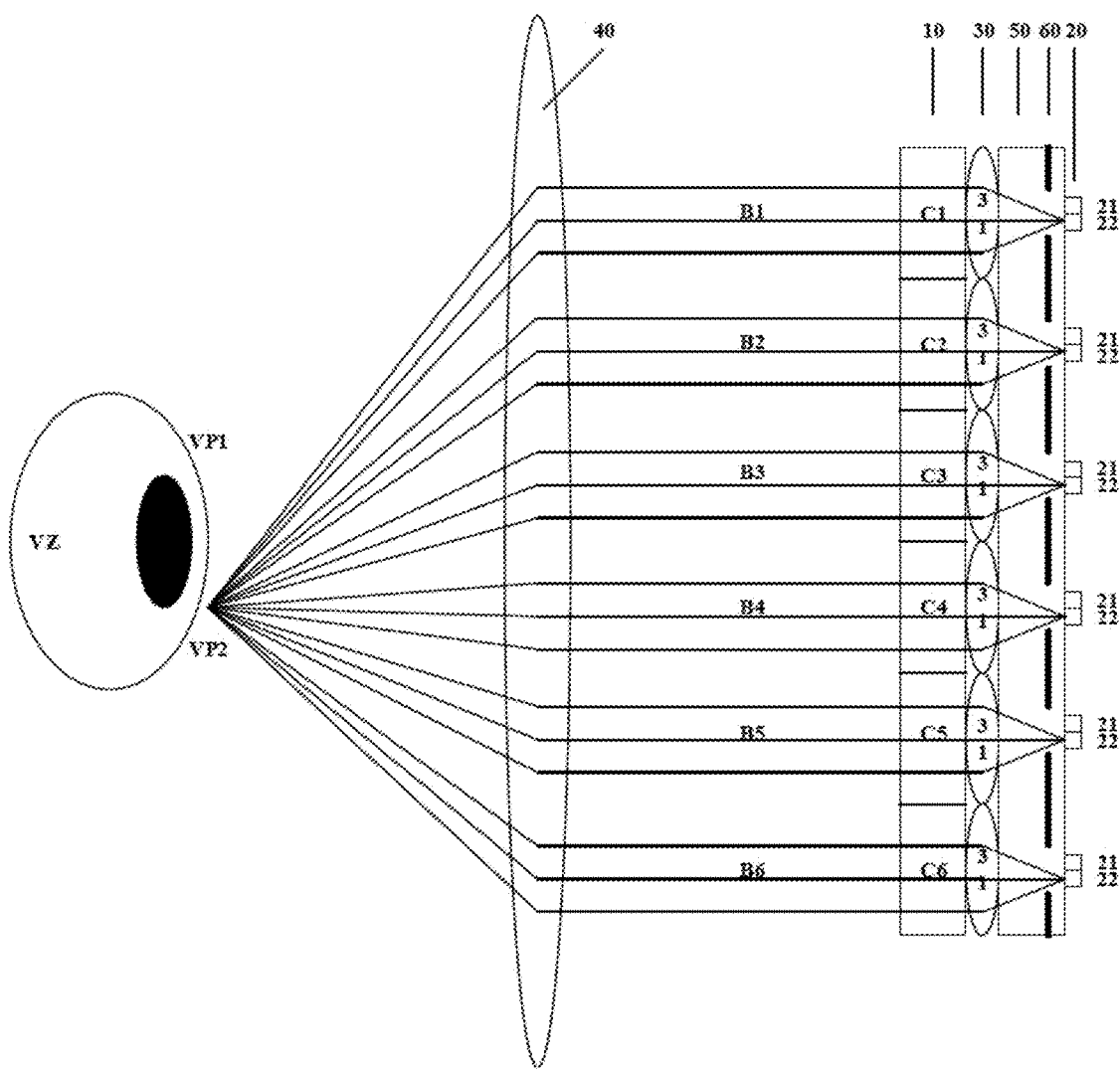

FIGS. 2A and 2B illustrate a process of displaying a three-dimensional image using a three-dimensional display apparatus for providing a plurality of view points to a view zone in some embodiments according to the present disclosure. Referring to FIG. 2A, at a first time point, first sub-images A1, A2, A3, A4, A5, and A6 respectively generated in the plurality of display sub-regions C1, C2, C3, C4, C5, and C6 are simultaneously displayed. The main lens 40 focuses each of first sub-images A1, A2, A3, A4, A5, and A6 to the first view point VP1. Referring to FIG. 2B, at a second time point, second sub-images B1, B2, B3, B4, B5, and B6 respectively generated in the plurality of display sub-regions C1, C2, C3, C4, C5, and C6, are simultaneously displayed, and the main lens 40 focuses each of second sub-images B1, B2, B3, B4, B5, and B6 to the second view point VP2. By displaying the plurality of first sub-images and the plurality of second sub-images in the time sequential order, and forming a plurality of view points in a same view zone, a near eye light field display can be achieved in the view zone VZ, enabling the three-dimensional display.

Figure 3A:
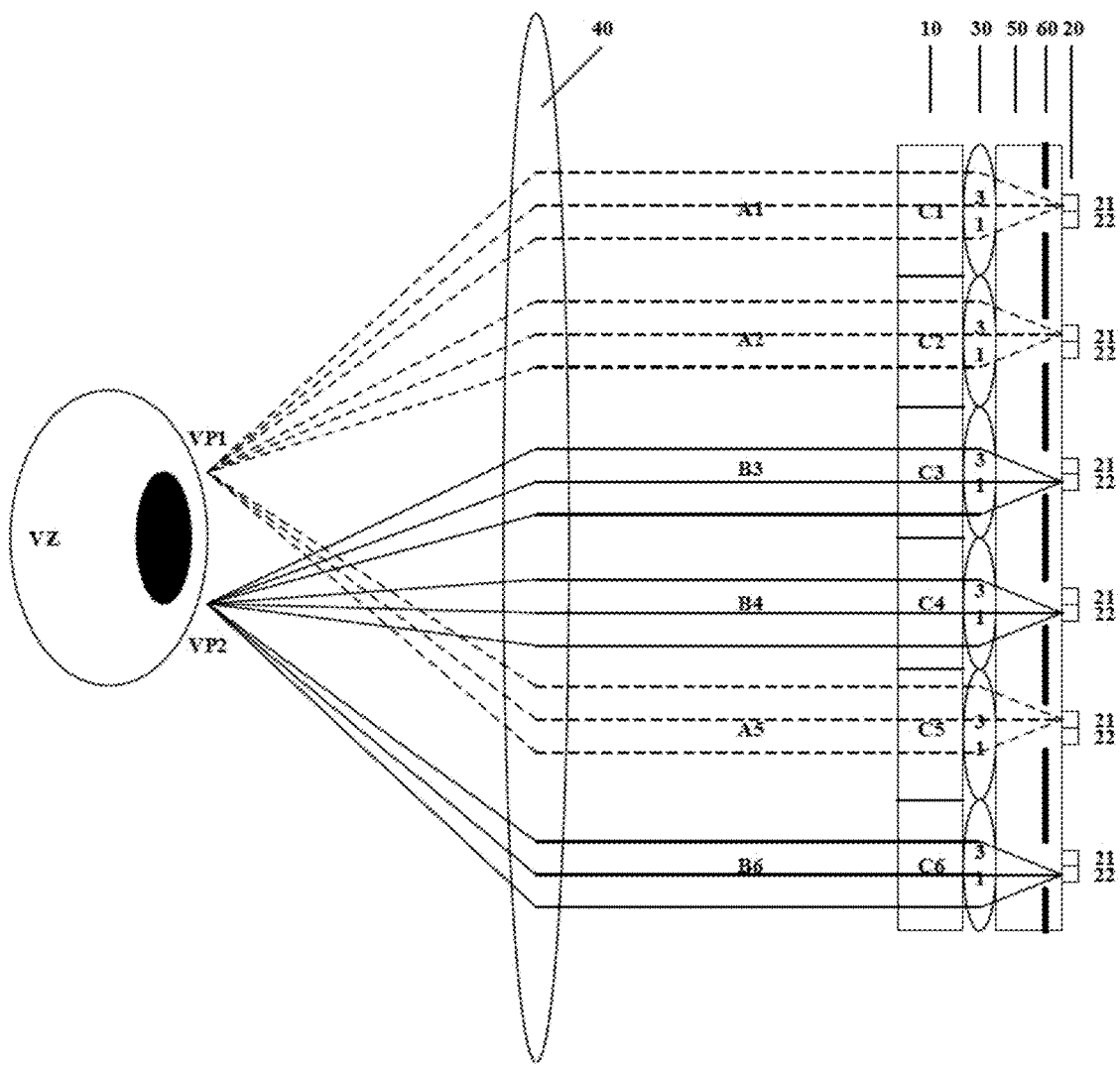
FIGS. 3A and 3B illustrate a process of displaying a three-dimensional image using a three-dimensional display apparatus for providing a plurality of view points to a view zone in some embodiments according to the present disclosure.
Figure 3B:
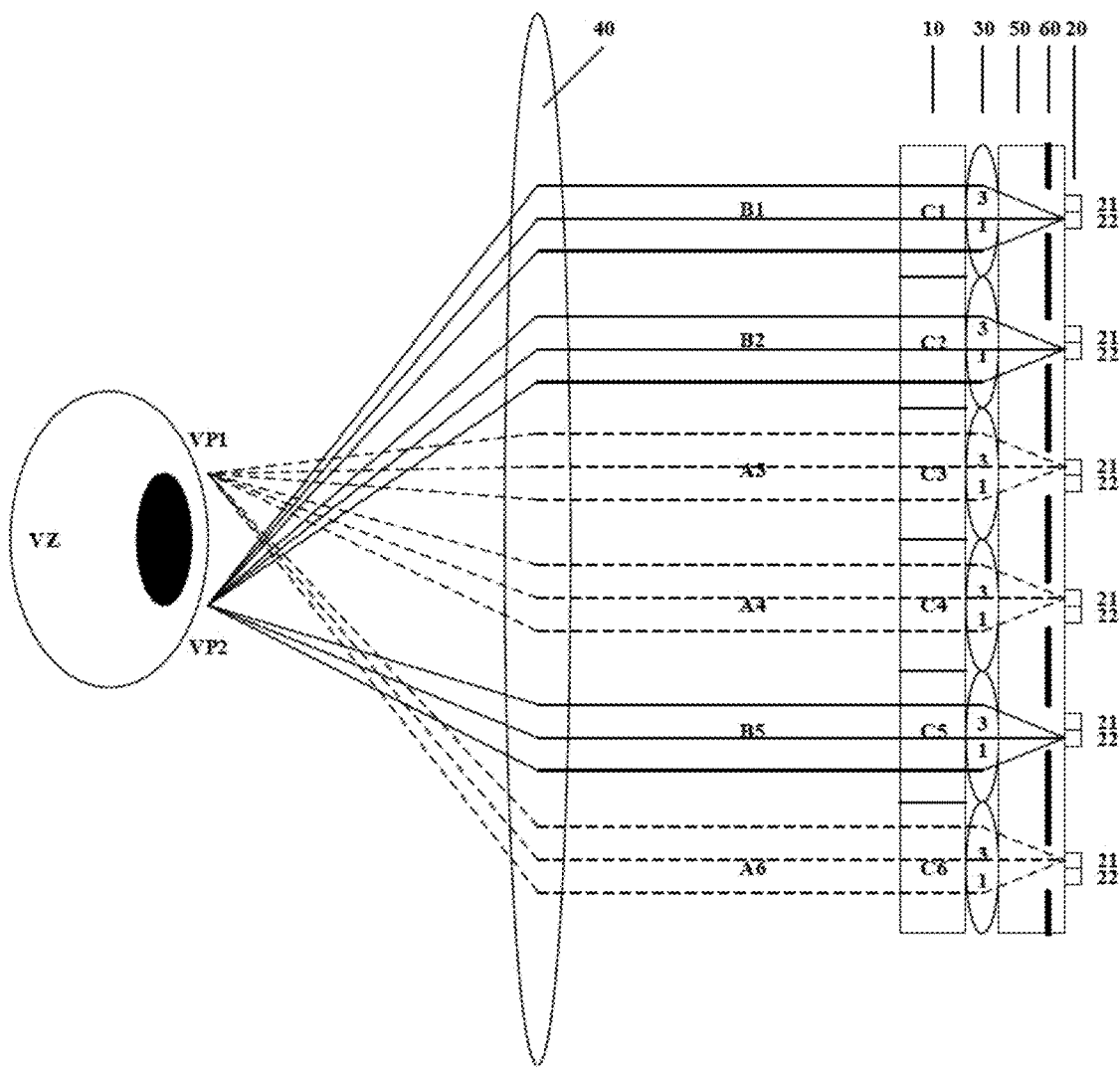

FIGS. 3A and 3B illustrate a process of displaying a three-dimensional image using a three-dimensional display apparatus for providing a plurality of view points to a view zone in some embodiments according to the present disclosure. Referring to FIG. 3A, at a first time point, first sub-images A1, A2, and A5, and second sub-images B3, B4, and B6, are simultaneously displayed. The main lens 40 focuses each of first sub-images A1, A2, and A5 to the first view point VP1, and focuses each of second sub-images B3, B4, and B6 to the second view point VP2. Referring to FIG. 3B, at a second time point, second sub-images B1, B2, and B5, and first sub-images A3, A4, and A6, are simultaneously displayed. The main lens 40 focuses each of second sub-images B1, B2, and B5 to the second view point VP2, and focuses each of first sub-images A3, A4, and A6 to the first view point VP1. By displaying the plurality of first sub-images and the plurality of second sub-images in the time sequential order, and forming a plurality of view points in a same view zone, a near eye light field display can be achieved in the view zone VZ, enabling the three-dimensional display.

In some embodiments, the first time sequential order includes more than two time sequential points. In one example, the first time sequential order includes a first time point, a second time point, and a third time point. In one example, at a first time point, first sub-images A1 and A2, and second sub-images B3 and B4, are simultaneously displayed, the main lens 40 focuses first sub-images A1 and A2 to the first view point VP1, and focuses second sub-images B3 and B4 to the second view point VP2. At a second time point, first sub-images A3 and A4, and second sub-images B5 and B6, are simultaneously displayed, the main lens 40 focuses first sub-images A3 and A4 to the first view point VP1, and focuses second sub-images B5 and B6 to the second view point VP2. At a third time point, first sub-images A5 and A6, and second sub-images B1 and B2, are simultaneously displayed, the main lens 40 focuses first sub-images A5 and A6 to the first view point VP1, and focuses second sub-images B1 and B2 to the second view point VP2.

Referring to FIG. 1 again, the main lens 40 in some embodiments has an area greater than or equal to an area of the display panel 10, e.g., an orthographic projection of the main lens 40 on a plane containing a main surface of the display panel 10 completely covers an orthographic projection of the display panel 10 on the same plane. The main lens 40 is disposed substantially parallel to the main surface of the display panel 10, and is spaced apart from the display panel 10 by a distance d. The main lens 40 may be spaced apart from the display panel 10 by any appropriate distances. The greater the distance d, the less stray light is received by the view zone VZ. Optionally, the distance d is no more than 5 cm, e.g., in a range of approximately 1 cm to approximately 5 cm.

The main lens 40 may be designed to have various appropriate focal length f1. The display panel 10 of any appropriate resolutions may be used in the present three-dimensional display apparatus. The greater the focal length f1, the lower the demand on the resolution of the display panel 10. Optionally, the display panel 10 has a resolution greater than or equal to a threshold resolution. Optionally, the threshold resolution can be derived by converting the angular resolution of the view zone VZ (e.g., an angular resolution of a human eye, which is approximately 0.02 degree) into a spatial resolution at a position where the main lens 40 is located. The threshold resolution is approximately a product of the number of view points and the spatial resolution obtained as described above.

The main lens 40 in some embodiments is a single lens as shown in FIG. 1. Optionally, the main lens 40 includes a plurality of sub-lens configured to respectively focus the plurality of first sub-images to the first view point VP1, and configured to respectively focus the plurality of second sub-images to the second view point VP2.

FIG. 1 shows two view points, e.g., the first view point VP1 and the second view point VP2. Optionally, a plurality of view points (e.g., more than two) may be formed in each view zone. The plurality of view points may be arranged in any appropriate manner. Optionally, the plurality of view points have a linear arrangement. Optionally, the plurality of view points are arranged to have a square pattern. Optionally, the plurality of view points are arranged to have a radial pattern. Optionally, the plurality of view points are arranged to have a spiral pattern. In some embodiments, the plurality of view points are spaced apart from each other by a distance no more than a diameter of a pupil of an average person, e.g., no more than 2.5 mm. The greater the number of plurality of view points in the view zone, the larger the eye box. However, a large number of plurality of view points result in a reduced resolution.

In some embodiments, the three-dimensional display apparatus is configured to provide N numbers of view points to a single view zone (e.g. a single eye), N is a positive integer≥2. The display panel is configured to display N sets of sub-images respectively corresponding to the N numbers of view points. Optionally, the back light source 20 includes N sets of light sources respectively configured to provide back light for the display panel to respectively display the N sets of sub-images. The N sets of sub-images are displayed in a first time sequential order, and the N sets of light sources are illuminated in a second time sequential order corresponding to the first time sequential order.

Figure 4:
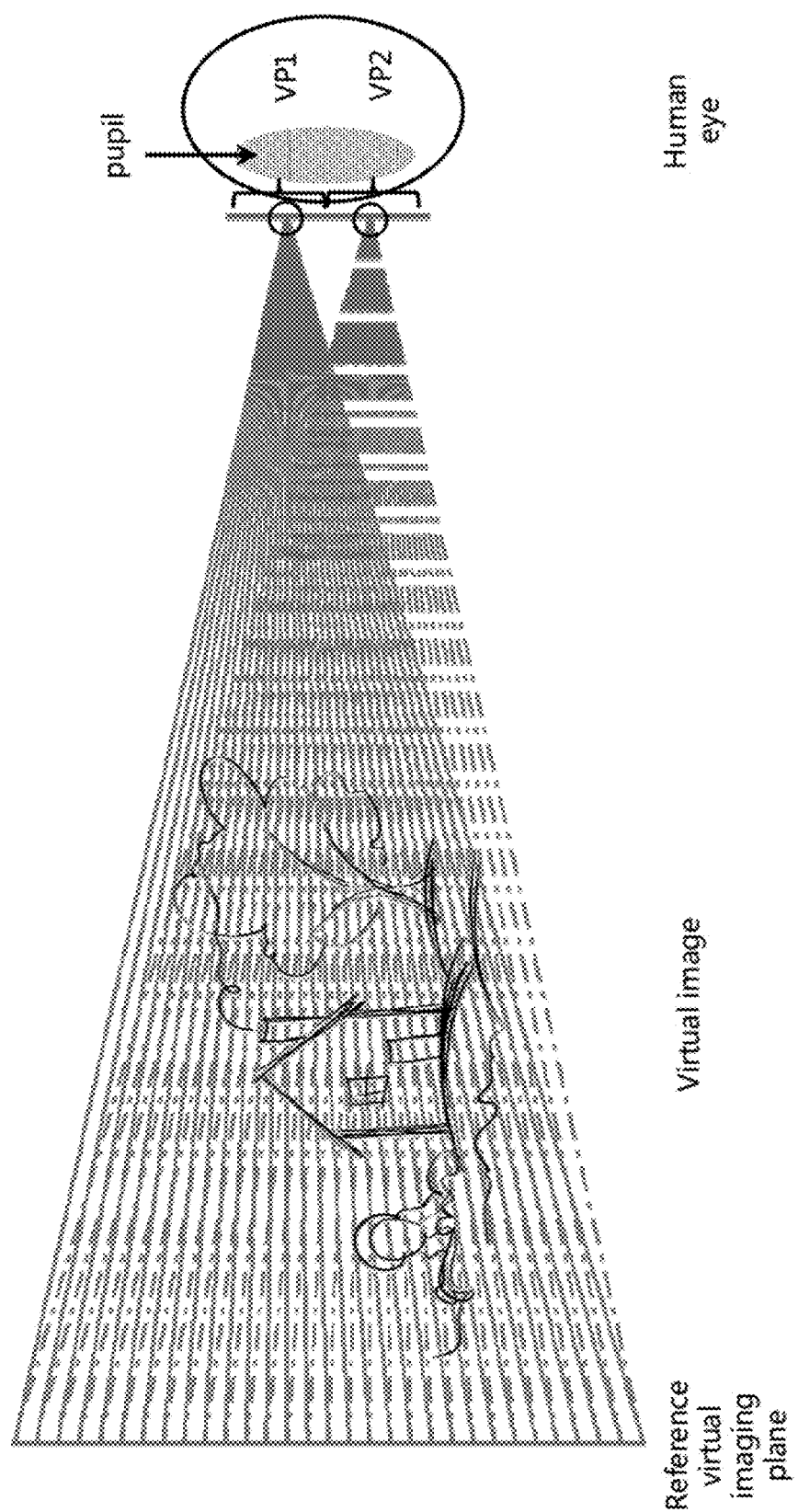
FIG. 4 illustrates a virtual image observed by a human eye using a three-dimensional display apparatus in some embodiments according to the present disclosure.

FIG. 4 illustrates a virtual image observed by a human eye using a three-dimensional display apparatus in some embodiments according to the present disclosure. Referring to FIG. 4, the three-dimensional display apparatus provided in the present disclosure is configured to provide a plurality of first sub-images to a first view point VP1 of the human eye, and a plurality of second sub-images to a second view point VP2 of the human eye, thereby presenting a three-dimensional virtual image to the human eye.

In some embodiments, the three-dimensional display apparatus further includes a micro-lens array on a side of the display panel facing away the main lens. Referring to FIG. 1, the three-dimensional display apparatus in some embodiments further includes a micro-lens array 30 on a side of the display panel 10 facing away the main lens 40, e.g., between the display panel 10 and the back light source 20. The micro-lens array 30 includes a plurality of micro-lenses 31 respectively corresponding to the plurality of display sub-regions. The plurality of first light sources 21 are respectively approximately at focal points fp of the plurality of micro-lenses 31, and the plurality of second light sources 22 are respectively approximately at the focal points fp of the plurality of micro-lenses 31. Each individual one of the plurality of micro-lenses 31 is configured to focus back light provided by a respective one of the plurality of first light sources 21 to a respective one of the plurality of display sub-regions thereby displaying a respective one of the plurality of first sub-images, and configured to focus back light provided by a respective one of the plurality of second light sources 22 to the respective one of the plurality of display sub-regions thereby displaying a respective one of the plurality of second sub-images.

Figure 5A:
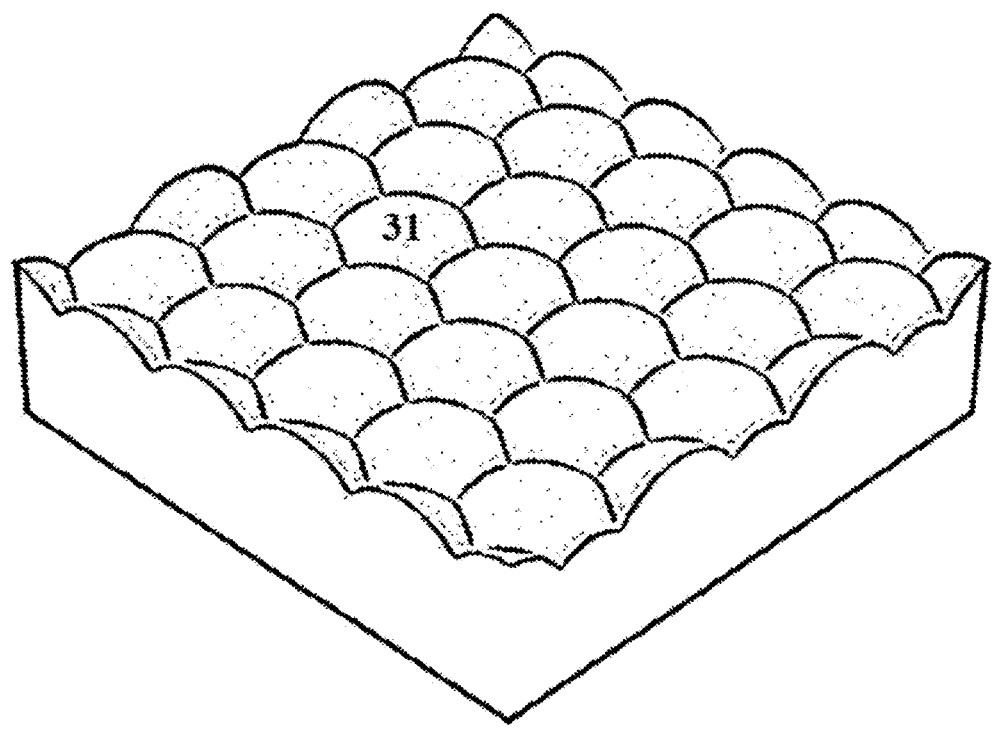
FIG. 5A is a three-dimensional view of a micro-lens array in some embodiments according to the present disclosure.
Figure 5B:
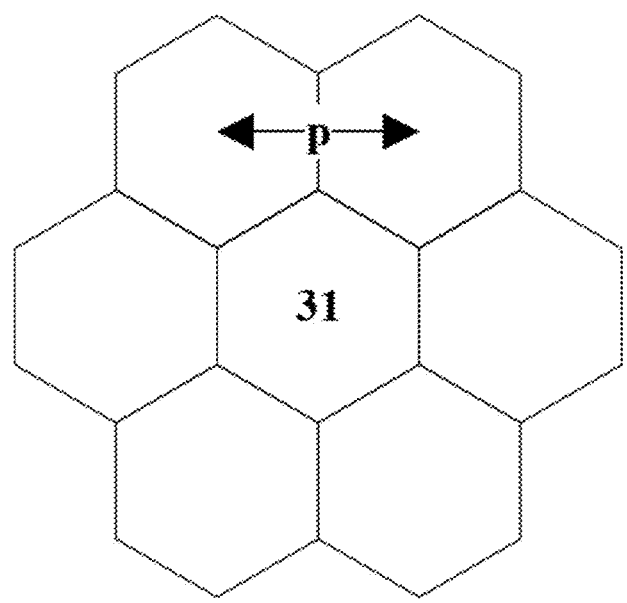
FIG. 5B is a plan view of a micro-lens array in some embodiments according to the present disclosure.

In some embodiments, the plurality of micro-lenses 31 have a substantially the same size, a substantially the same surface area, a substantially the same shape, and a substantially the same dimension. Each of the plurality of micro-lenses 31 can have various appropriate shapes. Examples of appropriate shapes for each of the plurality of micro-lenses 31 include a square shape, a hexagonal shape, a rectangular shape, a triangular shape, a circular shape, and so on. FIG. 5A is a three-dimensional view of a micro-lens array in some embodiments according to the present disclosure. FIG. 5B is a plan view of a micro-lens array in some embodiments according to the present disclosure. Referring to FIG. 5A and FIG. 5B, in some embodiments, each of the plurality of micro-lenses 31 has a hexagonal shape, the plurality of micro-lenses 31 form an array of closely packed micro-lenses. Optionally, the plurality of micro-lenses 31 in the micro-lens array have a pitch p. Optionally, the pitch p is in a range of approximately 0.8 mm to approximately 3.0 mm.

Various appropriate optical materials may be used for making the micro-lens array 30. Examples of appropriate optical materials for making the micro-lens array 30 include transparent resins, glass, quartz, silicon nitride, and so on.

Referring to FIG. 1, each of the plurality of micro-lenses 31 has a focal length f2. The focal length f2 may be any appropriate values. Optionally, the focal length f2 is in a range of approximately 0.1 mm to approximately 5 mm, e.g., approximately 1 mm.

Optionally, each of the plurality of first light sources 21 and the plurality of second light sources 22 has a size in a range of approximately 10 μm to approximately 200 μm, e.g., approximately 10 μm to approximately 50 μm, approximately 50 μm to approximately 100 μm, approximately 100 μm to approximately 150 μm, and approximately 150 μm to approximately 200 μm.

In one example of the second time sequential order, a first group of light sources and a second group of light sources are respectively illuminated in two sequential time points, e.g., a first time point and a second time point. Optionally, the first group of light sources includes exclusively one or multiple of the plurality of first light sources 21 and the second group of light sources includes exclusively one or multiple of the plurality of second light sources 22. Optionally, the first group of light sources includes a combination of one or multiple of the plurality of first light sources 21 and one or multiple of the plurality of second light sources 22, e.g., the first group of light sources includes at least one of the plurality of first light sources 21 and at least one of the plurality of second light sources 22. Optionally, the second group of light sources includes a combination of one or multiple of the plurality of second light sources 22 and one or multiple of the plurality of first light sources 21, e.g., the second group of light sources includes at least one of the plurality of second light sources 22 and at least one of the plurality of first light sources 21.

The second time sequential order substantially corresponds to the first time sequential order. For example, at the first time point, the first group of light sources are simultaneously illuminated, resulting in a first group of sub-images being simultaneously displayed; at the second time point, the second group of light sources are simultaneously illuminated, resulting in a second group of sub-images being simultaneously displayed. Optionally, the first group of light sources includes exclusively one or multiple of the plurality of first light sources 21, and the first group of sub-images includes exclusively one or multiple of the plurality of first sub-images; the second group of light sources includes exclusively one or multiple of the plurality of second light sources 22, and the second group of sub-images includes exclusively one or multiple of the plurality of second sub-images. Optionally, the first group of light sources includes a combination of one or multiple of the plurality of first light sources 21 and one or multiple of the plurality of second light sources 22, the first group of sub-images includes a combination of one or multiple of the plurality of first sub-images and one or multiple of the plurality of second sub-images; the second group of light sources includes a combination of one or multiple of the plurality of second light sources 22 and one or multiple of the plurality of first light sources 21, and the second group of sub-images includes a combination of one or multiple of the plurality of second sub-images and one or multiple of the plurality of first sub-images.

In some embodiments, light emitted from each individual one of the plurality of first light sources 21 is transmitted in a certain direction so that the main lens 40 focuses each the plurality of first sub-images displayed in the plurality of display sub-regions by backlight provided by the plurality of first light sources 21 to the first view point VP1; and light emitted from each individual one of the plurality of second light sources 22 is transmitted in a certain direction so that the main lens 40 focuses each the plurality of second sub-images displayed in the plurality of display sub-regions by backlight provided by the plurality of second light sources 22 to the second view point VP2. The time sequential display is achieved by sequentially turning on or off the first group of light sources and the second group of light sources as described above according to the second time sequential order.

Referring to FIG. 2A, at a first time point, the plurality of first light sources 21 respectively corresponding to the plurality of display sub-regions C1, C2, C3, C4, C5, and C6 are simultaneously illuminated, thereby providing backlight to the plurality of display sub-regions C1, C2, C3, C4, C5, and C6. The plurality of first sub-images A1, A2, A3, A4, A5, and A6 respectively generated in the plurality of display sub-regions C1, C2, C3, C4, C5, and C6, are simultaneously displayed. The main lens 40 focuses each of the plurality of first sub-images A1, A2, A3, A4, A5, and A6 to the first view point VP1. Referring to FIG. 2B, at a second time point, the plurality of second light sources 22 respectively corresponding to the plurality of display sub-regions C1, C2, C3, C4, C5, and C6 are simultaneously illuminated, thereby providing backlight to the plurality of display sub-regions C1, C2, C3, C4, C5, and C6. The plurality of second sub-images B1, B2, B3, B4, B5, and B6 respectively generated in the plurality of display sub-regions C1, C2, C3, C4, C5, and C6, are simultaneously displayed, and the main lens 40 focuses each of the plurality of second sub-images B1, B2, B3, B4, B5, and B6 to the second view point VP2. By illuminating the plurality of first light sources 21 and the plurality of second light sources 22 in the second time sequential order, and displaying the plurality of first sub-images and the plurality of second sub-images in the first time sequential order to form a plurality of view points in a same view zone, a near eye light field display can be achieved in the view zone VZ, enabling the three-dimensional display.

Referring to FIG. 3A, at a first time point, a plurality of first light sources 21 corresponding to display sub-regions C1, C2, and C5, and a plurality of second light sources 22 corresponding to display sub-regions C3, C4, and C6 are simultaneously illuminated. First sub-images A1, A2, and A5, and second sub-images B3, B4, and B6, are simultaneously displayed. The main lens 40 focuses each of first sub-images A1, A2, and A5 to the first view point VP1, and focuses each of second sub-images B3, B4, and B6 to the second view point VP2. Referring to FIG. 3B, at a second time point, a plurality of second light sources 22 corresponding to display sub-regions C1, C2, and C5 and a plurality of first light sources 21 corresponding to display sub-regions C3, C4, and C6 are simultaneously illuminated. Second sub-images B1, B2, and B5, and first sub-images A3, A4, and A6, are simultaneously displayed. The main lens 40 focuses each of second sub-images B1, B2, and B5 to the second view point VP2, and focuses each of first sub-images A3, A4, and A6 to the first view point VP1. By illuminating the plurality of first light sources 21 and the plurality of second light sources 22 in the second time sequential order, and displaying the plurality of first sub-images and the plurality of second sub-images in the time sequential order, and forming a plurality of view points in a same view zone, a near eye light field display can be achieved in the view zone VZ, enabling the three-dimensional display.

In some embodiments, the first time sequential order includes more than two time sequential points, and the second time sequential order includes more than two time sequential points. In one example, the first time sequential order includes a first time point, a second time point, and a third time point, and correspondingly the second time sequential order includes a first time point, a second time point, and a third time point. In one example, at a first time point, a plurality of first light sources 21 corresponding to display sub-regions C1 and C2, and a plurality of second light sources 22 corresponding to display sub-regions C3 and C4 are simultaneously illuminated. First sub-images A1 and A2, and second sub-images B3 and B4 are simultaneously displayed. The main lens 40 focuses first sub-images A1 and A2 to the first view point VP1, and focuses second sub-images B3 and B4 to the second view point VP2. At a second time point, a plurality of first light sources 21 corresponding to display sub-regions C3 and C4, and a plurality of second light sources 22 corresponding to display sub-regions C5 and C6, are simultaneously illuminated. First sub-images A3 and A4, and second sub-images B5 and B6, are simultaneously displayed. The main lens 40 focuses first sub-images A3 and A4 to the first view point VP1, and focuses second sub-images B5 and B6 to the second view point VP2. At a third time point, a plurality of first light sources 21 corresponding to display sub-regions C5 and C6, and a plurality of second light sources 22 corresponding to display sub-regions C1 and C2, are simultaneously illuminated. First sub-images A5 and A6, and second sub-images B1 and B2, are simultaneously displayed. The main lens 40 focuses first sub-images A5 and A6 to the first view point VP1, and focuses second sub-images B1 and B2 to the second view point VP2.

Figure 6:
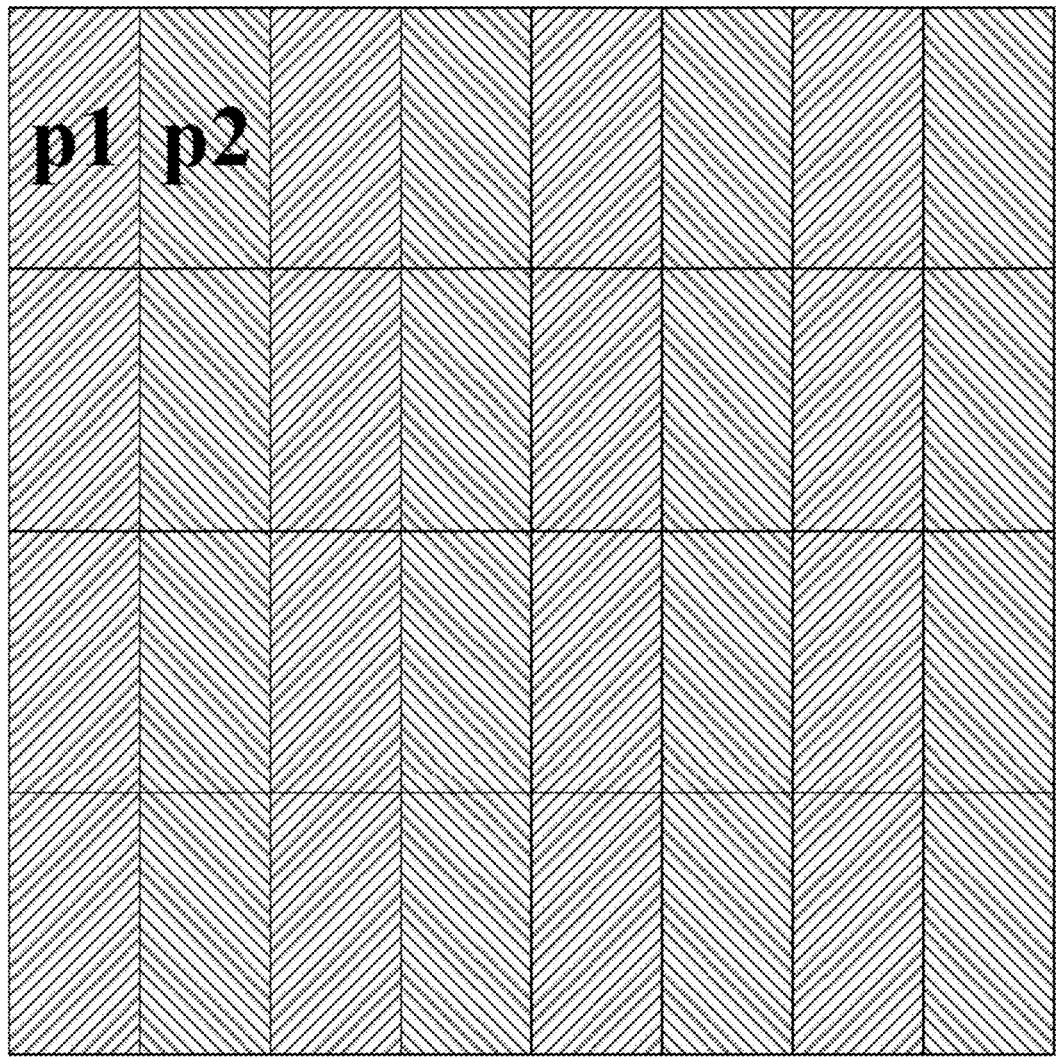
FIG. 6 illustrates one of the plurality of display sub-regions in some embodiments according to the present disclosure.

In some embodiments, a respective one of the plurality of first sub-images and a respective one of the plurality of second sub-images corresponding to a same one of the plurality of display sub-regions are generated by two different sets of pixels. FIG. 6 illustrates one of the plurality of display sub-regions in some embodiments according to the present disclosure. Referring to FIG. 6, the one of the plurality of display sub-regions in some embodiments includes a plurality of first pixels p1 and a plurality of second pixels p2. The plurality of first pixels p1 are configured to generate one of the plurality of first sub-images corresponding to the one of the plurality of display sub-regions. The plurality of second pixels p2 are configured to generate one of the plurality of second sub-images corresponding to the one of the plurality of display sub-regions. Thus, in some embodiments, the respective one of the plurality of first sub-images and the respective one of the plurality of second sub-images corresponding to the same one of the plurality of display sub-regions do not share any pixels in common. Optionally, the respective one of the plurality of first sub-images and the respective one of the plurality of second sub-images corresponding to the same one of the plurality of display sub-regions are two different images (e.g., one foreground image and one background image). Optionally, the respective one of the plurality of first sub-images and the respective one of the plurality of second sub-images corresponding to the same one of the plurality of display sub-regions are the same image (but emitted at different angles and generated using different sets of pixels).

In some embodiments, each light source (e.g., each of the plurality of first light sources 21 and the plurality of second light sources 22) includes one or more light emitting elements, e.g., one or more light emitting diodes. The plurality of light emitting elements in each individual one of the light sources optionally are configured to emit light of a same color. Optionally, the plurality of light emitting elements in each individual one of the light sources are configured to emit light of different colors. In some embodiments, each of the plurality of first light sources 21 and the plurality of second light sources 22 includes a first light emitting element of a first color and a second light emitting element of a second color, e.g., a first light emitting diode of a first color and a second light emitting diode of a second color. Optionally, each of the plurality of first light sources 21 and the plurality of second light sources 22 includes at least three light emitting elements respectively configured to emit light of three different colors, e.g., red light, green light, and blue light.

Figure 7A:
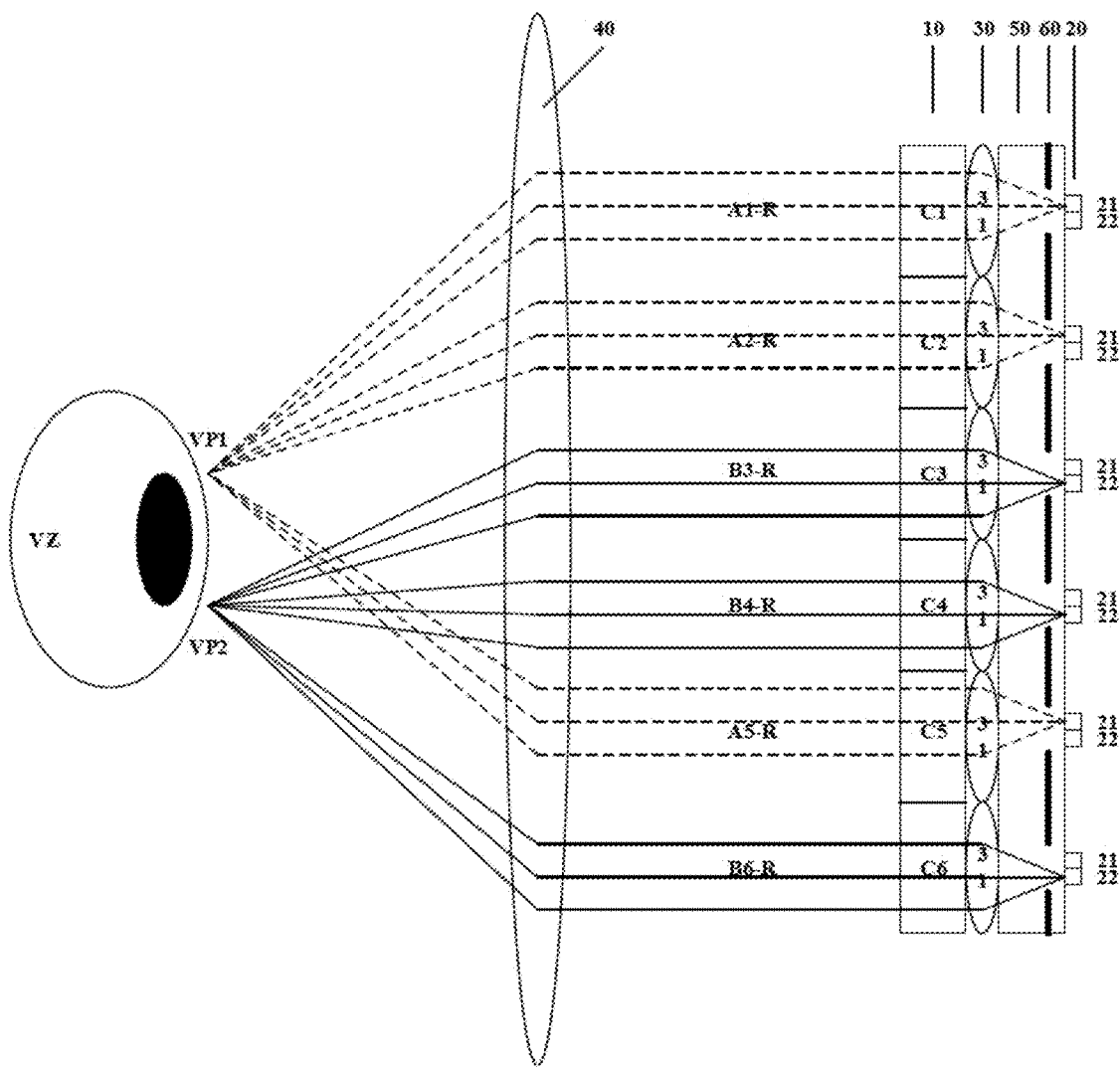
FIGS. 7A to 7F illustrate a process of displaying a three-dimensional image using a three-dimensional display apparatus for providing a plurality of view points to a view zone in some embodiments according to the present disclosure.
Figure 7B:
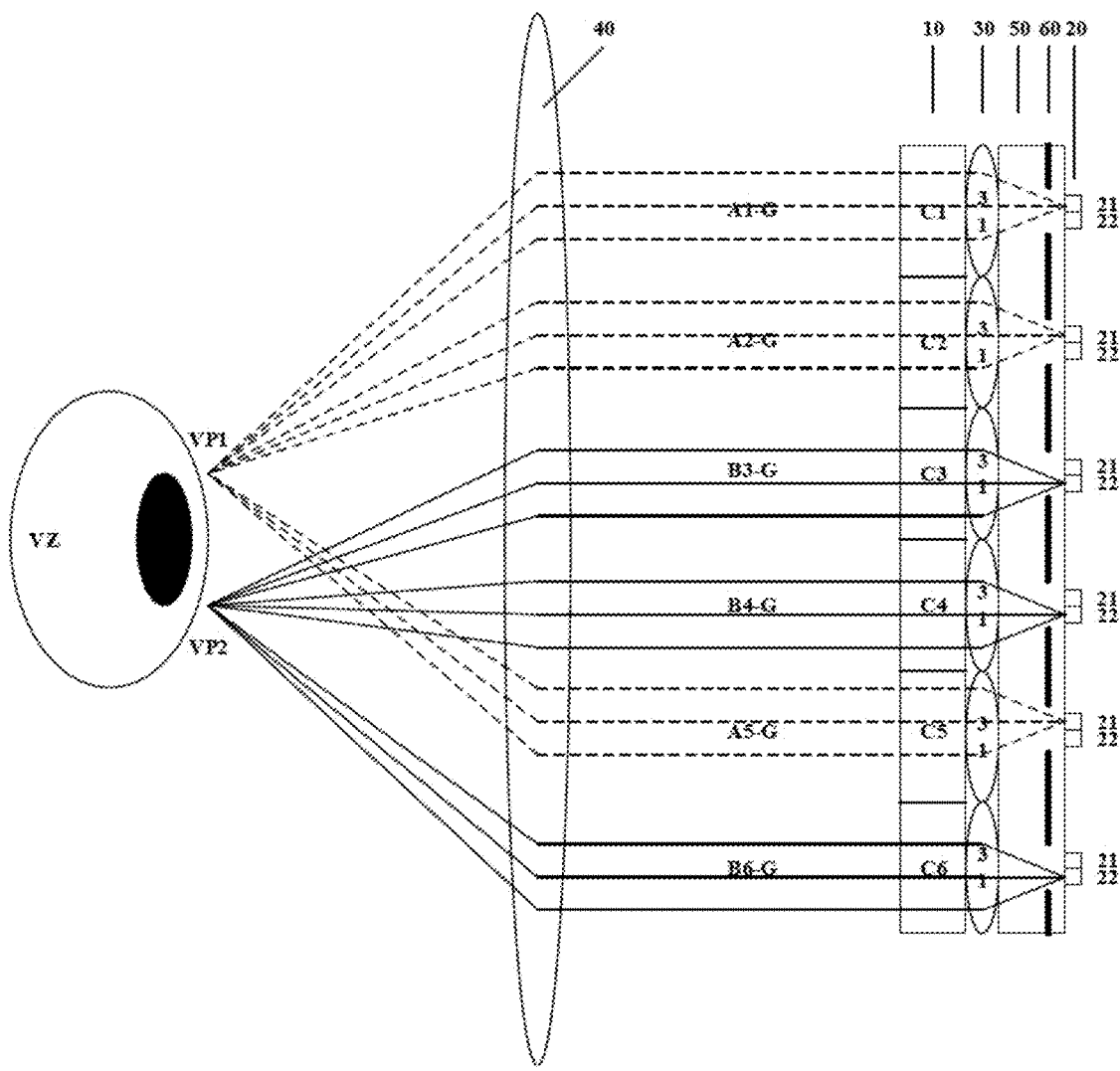
Figure 7C:
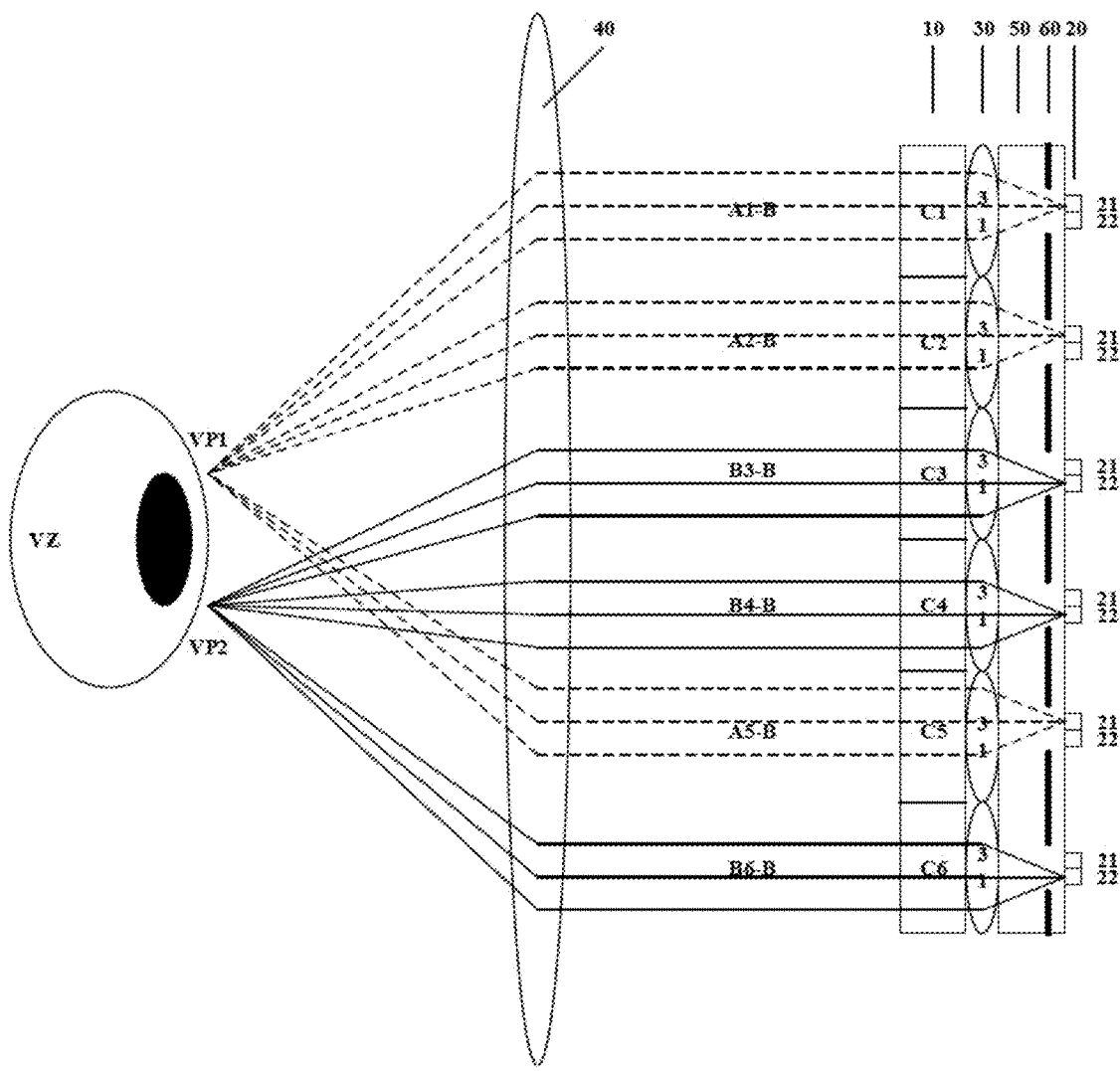
Figure 7D:
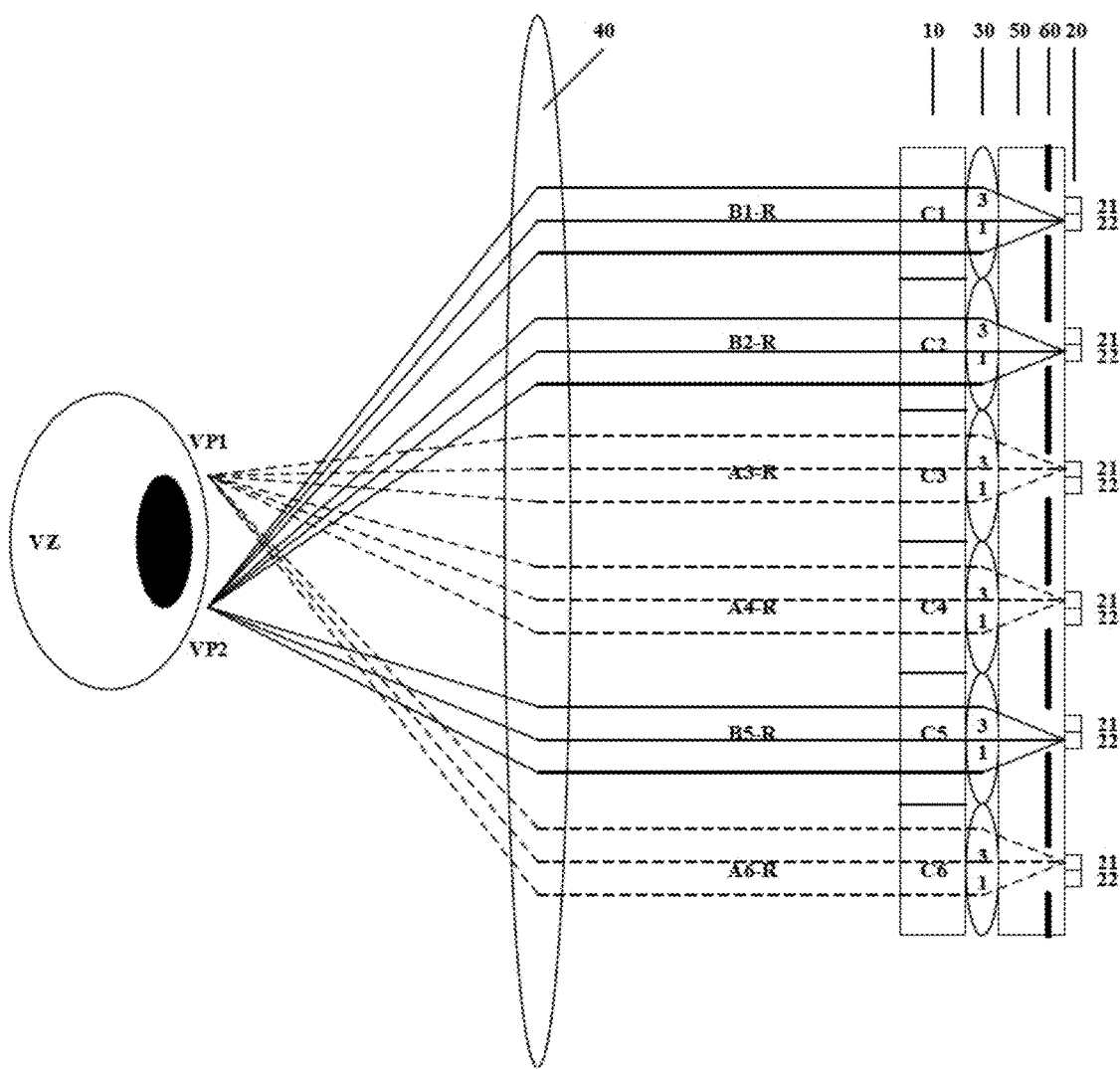
Figure 7E:
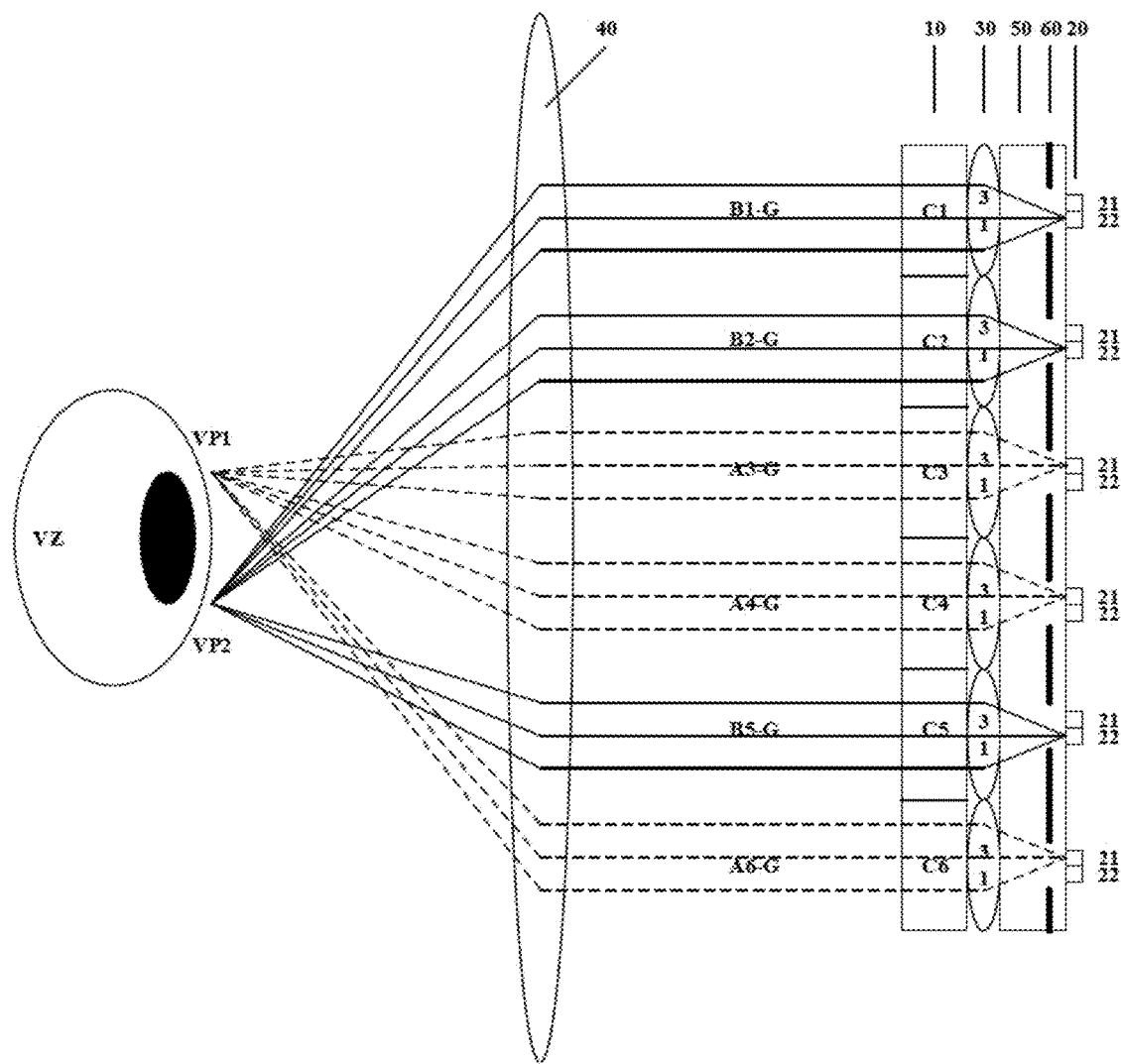
Figure 7F:
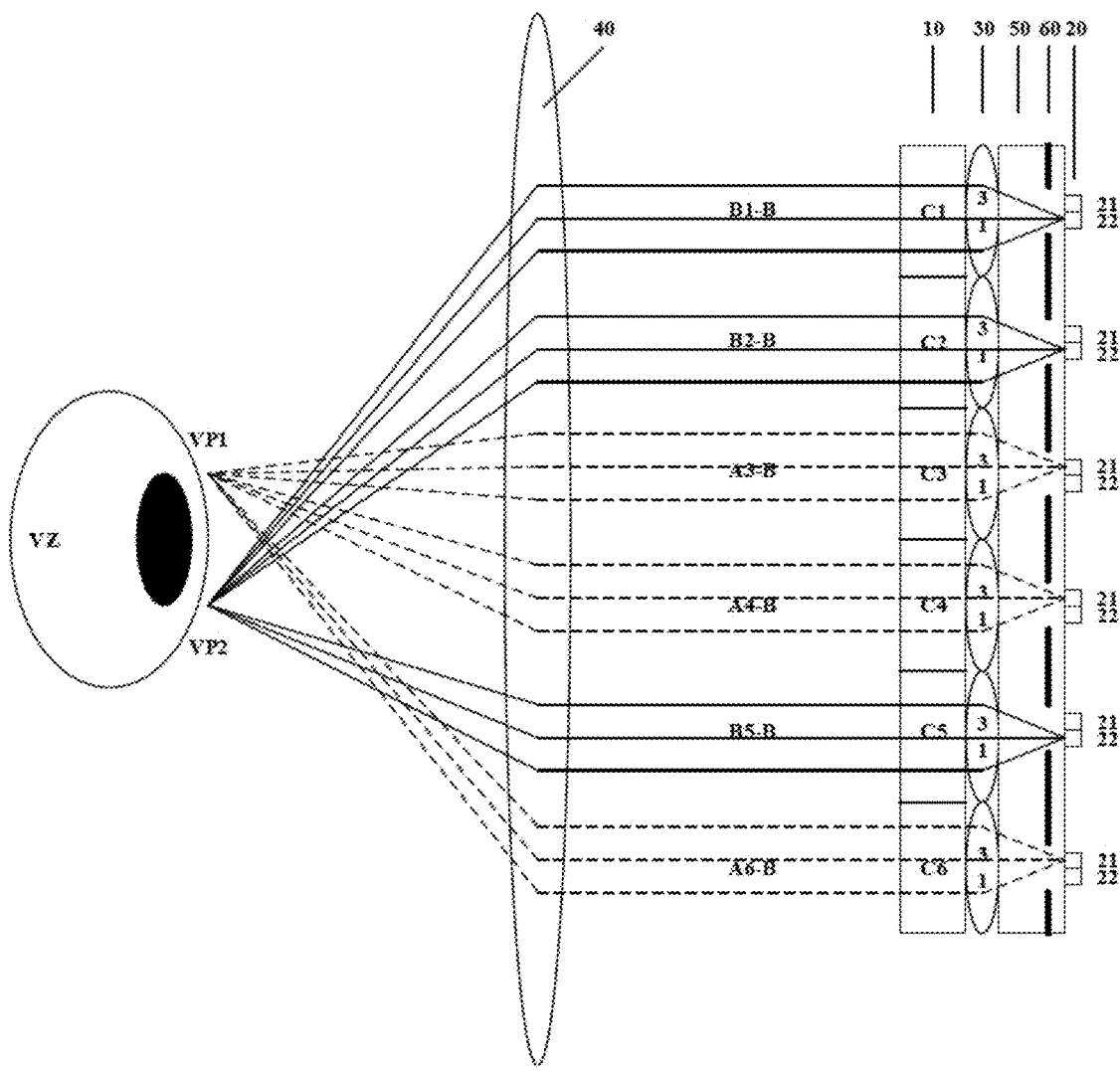

In some embodiments, the first light emitting element of the first color and the second light emitting element of the second color are illuminated in a third time sequential order. Optionally, the first light emitting element of the first color, the second light emitting element of the second color, and the third light emitting element of the third color are illuminated in a third time sequential order. Optionally, the third time sequential order is applied in combination with the first time sequential order and the second time sequential order discussed above. FIGS. 7A to 7F illustrate a process of displaying a three-dimensional image using a three-dimensional display apparatus for providing a plurality of view points to a view zone in some embodiments according to the present disclosure. Referring to FIG. 7A, at a first time point, red light emitting elements in a plurality of first light sources 21 corresponding to display sub-regions C1, C2, and C5, and red light emitting elements in a plurality of second light sources 22 corresponding to display sub-regions C3, C4, and C6 are simultaneously illuminated. First red sub-images A1-R, A2-R, and A5-R, and second red sub-images B3-R, B4-R, and B6-R are simultaneously displayed. The main lens 40 focuses each of first red sub-images A1-R, A2-R, and A5-R to the first view point VP1, and focuses second red sub-images B3-R, B4-R, and B6-R to the second view point VP2. Referring to FIG. 7B, at a second time point, green light emitting elements in a plurality of first light sources 21 corresponding to display sub-regions C1, C2, and C5, and green light emitting elements in a plurality of second light sources 22 corresponding to display sub-regions C3, C4, and C6 are simultaneously illuminated. First green sub-images A1-G, A2-G, and A5-G, and second green sub-images B3-G, B4-G, and B6-G are simultaneously displayed. The main lens 40 focuses each of first green sub-images A1-G, A2-G, and A5-G to the first view point VP1, and focuses second green sub-images B3-G, B4-G, and B6-G to the second view point VP2. Referring to FIG. 7C, at a third time point, blue light emitting elements in a plurality of first light sources 21 display sub-regions C1, C2, and C5, and blue light emitting elements in a plurality of second light sources 22 corresponding to display sub-regions C3, C4, and C6 are simultaneously illuminated. First blue sub-images A1-B, A2-B, and A5-B, and second blue sub-images B3-B, B4-B, and B6-B are simultaneously displayed. The main lens 40 focuses each of first blue sub-images A1-B, A2-B, and A5-B to the first view point VP1, and focuses second green sub-images B3-B, B4-B, and B6-B to the second view point VP2. Referring to FIG. 7D, at a fourth time point, red light emitting elements in a plurality of second light sources 22 corresponding to display sub-regions C1, C2, and C5 and red light emitting elements in a plurality of first light sources 21 corresponding to display sub-regions C3, C4, and C6 are simultaneously illuminated. Second red sub-images B1-R, B2-R, and B5-R, and first red sub-images A3-R, A4-R, and A6-R, are simultaneously displayed. The main lens 40 focuses each of second red sub-images B1-R, B2-R, and B5-R to the second view point VP2, and focuses each of first red sub-images A3-R, A4-R, and A6-R to the first view point VP1. Referring to FIG. 7E, at a fifth time point, green light emitting elements in a plurality of second light sources 22 corresponding to display sub-regions C1, C2, and C5 and green light emitting elements in a plurality of first light sources 21 corresponding to display sub-regions C3, C4, and C6 are simultaneously illuminated. Second green sub-images B1-G, B2-G, and B5-G, and first green sub-images A3-G, A4-G, and A6-G, are simultaneously displayed. The main lens 40 focuses each of second green sub-images B1-G, B2-G, and B5-G to the second view point VP2, and focuses each of first green sub-images A3-G, A4-G, and A6-G to the first view point VP1. Referring to FIG. 7F, at a sixth time point, blue light emitting elements in a plurality of second light sources 22 corresponding to display sub-regions C1, C2, and C5 and blue light emitting elements in a plurality of first light sources 21 corresponding to display sub-regions C3, C4, and C6 are simultaneously illuminated. Second blue sub-images B1-B, B2-B, and B5-B, and first blue sub-images A3-B, A4-B, and A6-B, are simultaneously displayed. The main lens 40 focuses each of second blue sub-images B1-B, B2-B, and B5-B to the second view point VP2, and focuses each of first blue sub-images A3-B, A4-B, and A6-B to the first view point VP1.

The third time sequential order may be applied in combination with the first time sequential order and the second time sequential order in any appropriate manners. For example, the light source illumination and image display schemes depicted in FIGS. 7A to 7F may be practiced in any appropriate time sequential order. In one example, the light source illumination and image display schemes may be practiced in a time sequential order from FIG. 7A to FIG. 7F, as discussed above. In another example, the light source illumination and image display schemes may be practiced in a time sequential order from FIG. 7A to FIG. 7D, then from FIG. 7D to FIG. 7B, then from FIG. 7B to FIG. 7E, then from FIG. 7E to FIG. 7C, and then from FIG. 7C to FIG. 7F. In another example, the light source illumination and image display schemes may be practiced in a time sequential order from FIG. 7A to FIG. 7E, then from FIG. 7E to FIG. 7C, then from FIG. 7C to FIG. 7D, then from FIG. 7D to FIG. 7B, and then from FIG. 7B to FIG. 7F.

In some embodiments, light emitting elements in a same individual one of the light sources are simultaneously illuminated. In one example, the light source illumination and image display schemes in FIG. 7A to FIG. 7C are practiced simultaneously at a first time point, and then the light source illumination and image display schemes in FIG. 7D to FIG. 7F are practiced simultaneously at a second time point.

By operating the three-dimensional display apparatus in a time-division mode, the resolution of display can be increased, e.g., by at least three times. In some embodiments, a subpixel of a first color, a subpixel of a second color, and a subpixel of a third color for a pixel can share a common physical space, e.g., a single subpixel in a liquid crystal display panel, but are operated in a time sequential order, e.g., images corresponding to the subpixel of the first color, the subpixel of the second color, and the subpixel of the third color are respectively displayed at different time points in a same physical space. Referring to FIG. 7A to 7F, any subpixel in the display sub-region C1 can be used for illustrating the time-division operating mode of the three-dimensional display apparatus. Referring to FIGS. 7A to 7C, a first subpixel in the display sub-region C1 corresponding to the first view point VP1 is illuminated by a red light emitting element in a respective one of the plurality of first light source 21 corresponding to display sub-regions C1 at the first time point, is illuminated by a green light emitting element in the respective one of the plurality of first light source 21 corresponding to display sub-regions C1 at the second time point, and is illuminated by a blue light emitting element in the respective one of the plurality of first light source 21 corresponding to display sub-regions C1 at the third time point. In a time sequential order, a red image, a green image, and a blue image are sequentially displayed in the first subpixel, forming a composite image for color display. Similarly, referring to FIGS. 7D to 7F, a second subpixel in the display sub-region C1 corresponding to the second view point VP2 is illuminated by a red light emitting element in a respective one of the plurality of second light source 22 corresponding to display sub-regions C1 at the fourth time point, is illuminated by a green light emitting element in the respective one of the plurality of second light source 22 corresponding to display sub-regions C1 at the fifth time point, and is illuminated by a blue light emitting element in the respective one of the plurality of second light source 22 corresponding to display sub-regions C1 at the sixth time point. In a time sequential order, a red image, a green image, and a blue image are sequentially displayed in the second subpixel, forming a composite image for color display. Because color display in a pixel can be realized in a single subpixel, the display resolution can be enhanced. Moreover, in this mode, color display in the three-dimensional display apparatus can be achieved without a color filter.

Referring to FIG. 1 again, the three-dimensional display apparatus in some embodiments further includes a lens screen 60 between the micro-lens array 30 and the back light source 20. The lens screen 60 has a plurality of openings O configured to respectively allow light emitted from the plurality of first light sources 21 and the plurality of second light sources 22 to transmit there-through.

In some embodiments, the three-dimensional display apparatus further includes a substantially transparent optical material layer 50 spacing apart the micro-lens array 30 and the back light source 20. Various appropriate optical materials may be used for making the substantially transparent optical material layer 50. Examples of appropriate optical materials for making the substantially transparent optical material layer 50 include transparent resins, glass, quartz, silicon nitride, and so on. The substantially transparent optical material layer 50 has a thickness such that the plurality of first light sources 21 are respectively approximately at the focal points fp of the plurality of micro-lenses 31, and the plurality of second light sources 22 are respectively approximately at the focal points fp of the plurality of micro-lenses 31.

Figure 8:
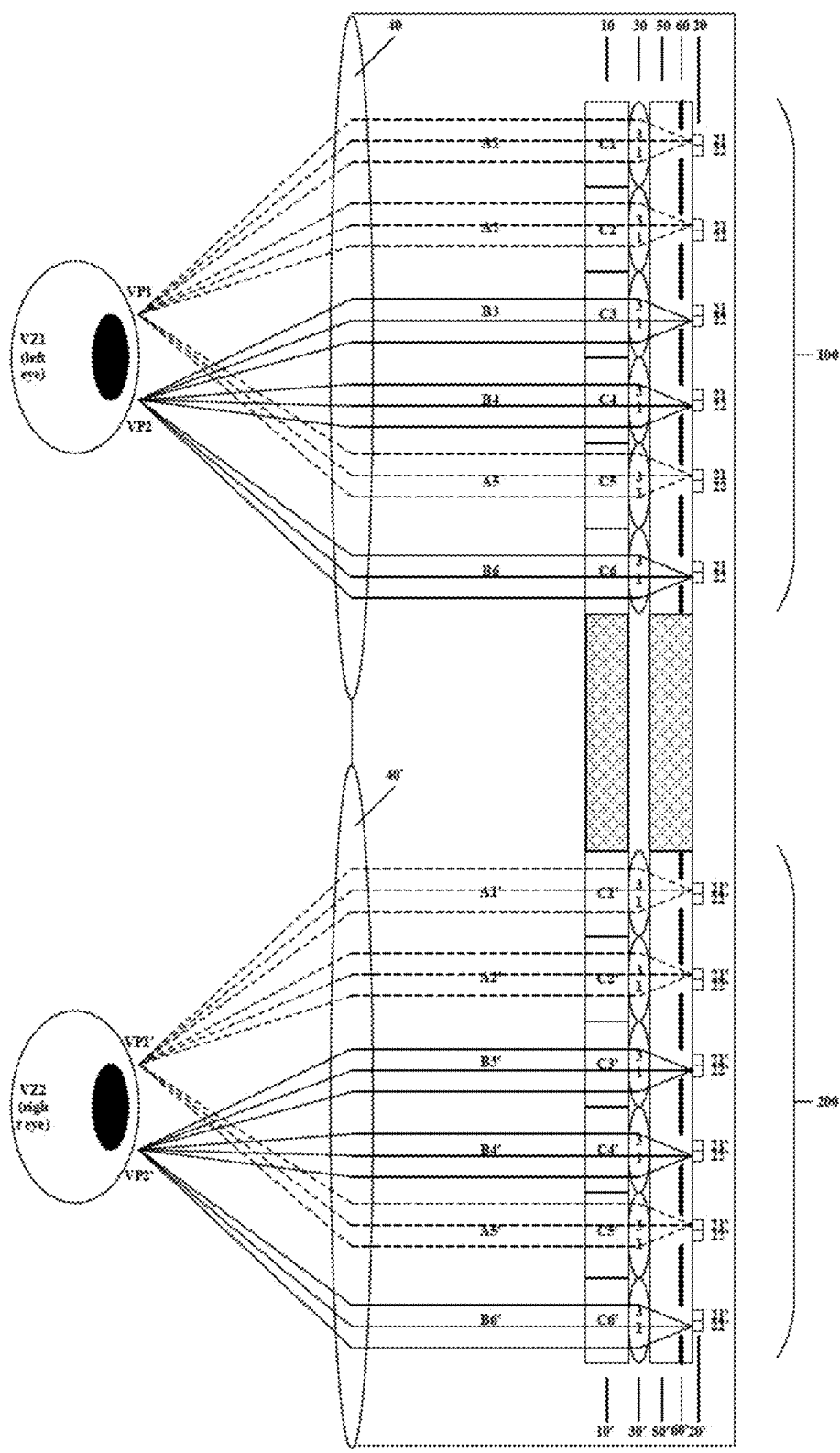
FIG. 8 is a schematic diagram illustrating the structure of a three-dimensional imaging apparatus in some embodiments according to the present disclosure.

In another aspect, the present disclosure provides a three-dimensional imaging apparatus for providing a plurality of view zones to a left eye and a right eye respectively. In some embodiments, the three-dimensional imaging apparatus includes a first three-dimensional display apparatus and a second three-dimensional display apparatus, each of which is a three-dimensional display apparatus described above (e.g., the three-dimensional display apparatus in FIGS. 1 and 4). FIG. 8 is a schematic diagram illustrating the structure of a three-dimensional imaging apparatus in some embodiments according to the present disclosure. Referring to FIG. 8, the three-dimensional imaging apparatus in some embodiments includes a first three-dimensional display apparatus 100 and a second three-dimensional display apparatus 200. The first three-dimensional display apparatus 100 is configured to focus each a plurality of first sub-images displayed by a first display panel 10 to a first view point VP1 of the left eye (VZ1) and focus each a plurality of second sub-images displayed by the first display panel 10 to a second view point VP2 of the left eye (VZ1). The second three-dimensional display apparatus 200 is configured to focus each a plurality of first sub-images displayed by a second display panel 10' to a first view point VP1' of the right eye (VZ2) and focus each a plurality of second sub-images displayed by the second display panel 10' to a second view point VP2' of the right eye (VZ2). Optionally, the first display panel 10 and the second display panel 10' are configured to display a same image at a same tune point. Optionally, the three-dimensional imaging apparatus is a virtual reality imaging apparatus. Optionally, the three-dimensional imaging apparatus is an augmented reality imaging apparatus.

Figure 9:
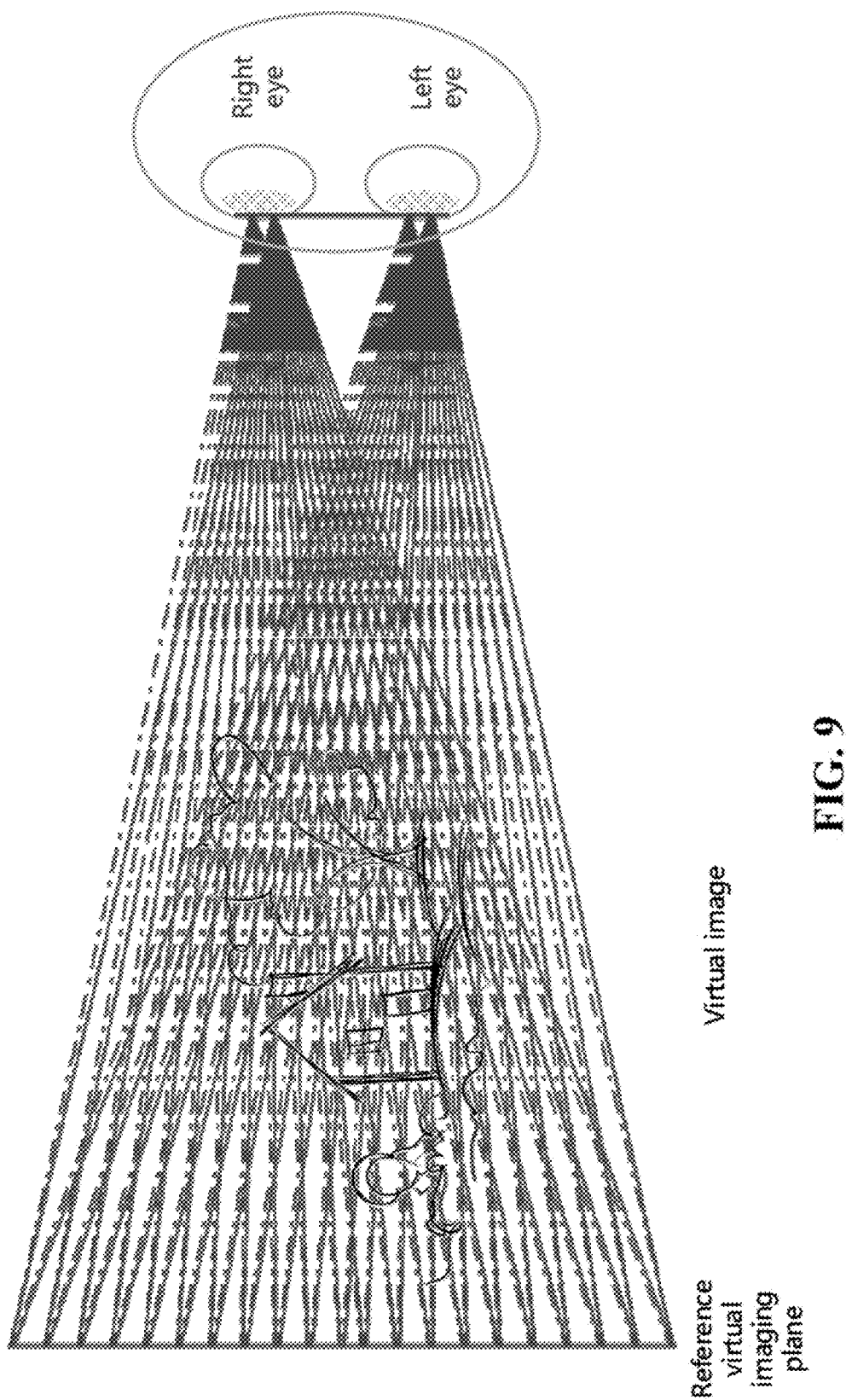
FIG. 9 illustrates a virtual image observed by a pair of human eyes using a three-dimensional imaging apparatus in some embodiments according to the present disclosure.

FIG. 9 illustrates a virtual image observed by a pair of human eyes using a three-dimensional imaging apparatus in some embodiments according to the present disclosure. Referring to FIG. 9, the three-dimensional imaging apparatus provided in the present disclosure is configured to provide a plurality of first sub-images to a first view point of the right eye, and a plurality of second sub-images to a second view point of the right eye. Similarly, the three-dimensional imaging apparatus is also configured to provide a plurality of first sub-images to a first view point of the left eye, and a plurality of second sub-images to a second view point of the left eye. In the present three-dimensional imaging apparatus, the monocular convergence distance of each individual eye is substantially the same as the binocular convergence distance of left eye and right eye. By having the monocular convergence distance to match with the binocular convergence distance, the present three-dimensional imaging apparatus obviates the issues associated with conventional three-dimensional imaging apparatuses, e.g., viewing dizziness.

In another aspect, the present disclosure provides a method of displaying a three-dimensional image using a three-dimensional display apparatus for providing a plurality of view points to a view zone. The three-dimensional display apparatus is one described above (e.g., the three-dimensional display apparatus depicted in FIG. 1). In some embodiments, the method includes displaying the plurality of first sub-images and the plurality of second sub-images in a first time sequential order by illuminating the plurality of first light sources and the plurality of second light sources in a second time sequential order corresponding to the first time sequential order. Optionally, a respective one of the plurality of first sub-images and a respective one of the plurality of second sub-images displayed in a same one of the plurality of display sub-regions are displayed at different time points according to the first time sequential order. Optionally, the method includes focusing back light provided by the plurality of first light sources by the plurality of micro-lenses respectively to the plurality of display sub-regions thereby displaying the plurality of first sub-images; and focusing back light provided by the plurality of second light sources by the plurality of micro-lenses respectively to the plurality of display sub-regions thereby displaying the plurality of second sub-images.

In some embodiments, the first time sequential order includes displaying one or multiple of the plurality of first sub-images but none of the plurality of second sub-images at a first time point, and displaying one or multiple of the plurality of second sub-images but none of the plurality of first sub-images at a second time point. Optionally, the second time sequential order includes illuminating one or multiple of the plurality of first light sources corresponding to the one or multiple of the plurality of first sub-images, but none of the plurality of second light sources at the first time point, and illuminating one or multiple of the plurality of second light sources corresponding to the one or multiple of the plurality of second sub-images, but none of the plurality of first light sources at a second time point.

In some embodiments, the first time sequential order includes displaying a combination of one or multiple of the plurality of first sub-images and one or multiple of the plurality of second sub-images at a first time point, and displaying a combination of one or multiple of the plurality of second sub-images and one or multiple of the plurality of first sub-images at a second time point. Optionally, the second time sequential order includes illuminating a combination of one or multiple of the plurality of first light sources corresponding to the one or multiple of the plurality of first sub-images, and one or multiple of the plurality of second light sources corresponding to the one or multiple of the plurality of second sub-images at the first time point, and illuminating a combination of one or multiple of the plurality of second light sources corresponding to the one or multiple of the plurality of second sub-images, and one or multiple of the plurality of first light sources corresponding to the one or multiple of the plurality of first sub-images at a second time point.

In some embodiments, each of the plurality of first light sources and the plurality of second light sources includes a first light emitting element of a first color and a second light emitting element of a second color. Optionally, the first light emitting element of the first color and the second light emitting element of the second color are illuminated in a time sequential order. Optionally, each of the plurality of first light sources and the plurality of second light sources comprises a first light emitting element of a first color, a second light emitting element of a second color, and a third light emitting element of a third color. Optionally, the method further includes illuminating the first light emitting element of the first color, the second light emitting element of the second color, and the third light emitting element of the third color in a respective one of the plurality of first light sources time sequentially; and illuminating the first light emitting element of the first color, the second light emitting element of the second color, and the third light emitting element of the third color in a respective one of the plurality of second light sources time sequentially.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A three-dimensional display apparatus for providing a plurality of view points to a view zone, comprising:
a display panel configured to display a plurality of first sub-images respectively in a plurality of display sub-regions and display a plurality of second sub-images respectively in the plurality of display sub-regions, the plurality of first sub-images and the plurality of second sub-images being displayed in a first time sequential order so that a respective one of the plurality of first sub-images and a respective one of the plurality of second sub-images displayed in a same one of the plurality of display sub-regions are displayed at different time points; and
a main lens between the display panel and the view zone, and configured to focus each of the plurality of first sub-images to a first view point and focus each of the plurality of second sub-images to a second view point, thereby displaying a three-dimensional image, the first view point and the second view point being within a same view zone corresponding to a single eye of a user, the second view point being different from the first view point.

2. The three-dimensional display apparatus of claim 1, further comprising:
a back light source comprising a plurality of first light sources and a plurality of second light sources, the plurality of first light sources configured to provide back light for the display panel to respectively display the plurality of first sub-images, the plurality of second light sources configured to provide back light for the display panel to respectively display the plurality of second sub-images; and
a micro-lens array between the display panel and the back light source;
wherein the plurality of first light sources and the plurality of second light sources are configured to be illuminated in a second time sequential order corresponding to the first time sequential order;
wherein the micro-lens array comprises a plurality of micro-lenses respectively corresponding to the plurality of display sub-regions;
the plurality of first light sources are respectively approximately at focal points of the plurality of micro-lenses;
the plurality of second light sources are respectively approximately at the focal points of the plurality of micro-lenses;
each individual one of the plurality of micro-lenses is configured to focus back light provided by a respective one of the plurality of first light sources to a respective one of the plurality of display sub-regions thereby displaying a respective one of the plurality of first sub-images, and configured to focus back light provided by a respective one of the plurality of second light sources to the respective one of the plurality of display sub-regions thereby displaying a respective one of the plurality of second sub-images.

3. The three-dimensional display apparatus of claim 2, wherein each of the plurality of micro-lenses has a focal length in a range of approximately 0.1 mm to approximately 5 mm.

4. The three-dimensional display apparatus of claim 2, wherein the plurality of micro-lenses are arranged as an array of micro-lenses, a cross-section of each micro-lens in the array of micro-lenses has a substantially hexagonal shape.

5. The three-dimensional display apparatus of claim 2, wherein each of the plurality of first light sources and the plurality of second light sources comprises a first light emitting element of a first color, a second light emitting element of a second color, and a third light emitting element of a third color.

6. The three-dimensional display apparatus of claim 5, wherein the first light emitting element of the first color, the second light emitting element of the second color, and the third light emitting element of the third color in a respective one of the plurality of first light sources are configured to be illuminated time sequentially; and
the first light emitting element of the first color, the second light emitting element of the second color, and the third light emitting element of the third color in a respective one of the plurality of second light sources are configured to be illuminated time sequentially.

7. The three-dimensional display apparatus of claim 5, wherein each of the plurality of first light sources and the plurality of second light sources has a size in a range of approximately 10 μm to approximately 200 μm.

8. The three-dimensional display apparatus of claim 1, wherein a respective one of the plurality of first sub-images and a respective one of the plurality of second sub-images corresponding to a same one of the plurality of display sub-regions are generated by two different sets of pixels in the same one of the plurality of display sub-regions, the two different sets of pixels having no pixel in common.

9. The three-dimensional display apparatus of claim 2, further comprising a lens screen between the micro-lens array and the back light source;
the lens screen has a plurality of openings configured to respectively allow light emitted from the plurality of first light sources and the plurality of second light sources to transmit there-through.

10. The three-dimensional display apparatus of claim 2, further comprising a substantially transparent optical material layer spacing apart the micro-lens array and the back light source.

11. The three-dimensional display apparatus of claim 1, wherein the main lens and the display panel are spaced apart by a distance equal to or less than 5 cm.

12. The three-dimensional display apparatus of claim 1, wherein the first view point and the second view point are spaced apart by a distance no more than 2.5 mm.

13. A three-dimensional imaging apparatus for providing a plurality of view zones to a left eye and a right eye respectively, comprising a first three-dimensional display apparatus and a second three-dimensional display apparatus, each of which is a three-dimensional display apparatus according to claim 1;
wherein the first three-dimensional display apparatus is configured to focus each of a plurality of first sub-images displayed by a first display panel to a first view point of the left eye and focus each of a plurality of second sub-images displayed by the first display panel to a second view point of the left eye; and
the second three-dimensional display apparatus is configured to focus each of a plurality of first sub-images displayed by a second display panel to a first view point of the right eye and focus each of a plurality of second sub-images displayed by the second display panel to a second view point of the right eye.

14. A method of displaying a three-dimensional image using a three-dimensional display apparatus for providing a plurality of view points to a view zone;
  wherein the three-dimensional display apparatus comprises:
  a display panel configured to display a plurality of first sub-images respectively in a plurality of display sub-regions and display a plurality of second sub-images respectively in the plurality of display sub-regions; and
  a main lens between the display panel and the view zone, and configured to focus each of the plurality of first sub-images to a first view point and focus each of the plurality of second sub-images to a second view point, thereby displaying a three-dimensional image, the first view point and the second view point being within a same view zone corresponding to a single eye of a user, the second view point being different from the first view point;
  wherein the method comprises displaying the plurality of first sub-images and the plurality of second sub-images in a first time sequential order; and
  a respective one of the plurality of first sub-images and a respective one of the plurality of second sub-images displayed in a same one of the plurality of display sub-regions are displayed at different time points according to the first time sequential order.

15. The method of claim 14, wherein the three-dimensional display apparatus further comprises a back light source comprising a plurality of first light sources and a plurality of second light sources, the plurality of first light sources configured to provide back light for the display panel to respectively display the plurality of first sub-images, the plurality of second light sources configured to provide back light for the display panel to respectively display the plurality of second sub-images;
  wherein the method further comprises illuminating the plurality of first light sources and the plurality of second light sources in a second time sequential order corresponding to the first time sequential order;
  wherein each of the plurality of first light sources and the plurality of second light sources comprises a first light emitting element of a first color, a second light emitting element of a second color, and a third light emitting element of a third color;
  wherein the method comprises illuminating the first light emitting element of the first color, the second light emitting element of the second color, and the third light emitting element of the third color in a respective one of the plurality of first light sources time sequentially; and
  illuminating the first light emitting element of the first color, the second light emitting element of the second color, and the third light emitting element of the third color in a respective one of the plurality of second light sources time sequentially.

16. The method of claim 15, wherein the three-dimensional display apparatus further comprises a micro-lens array between the display panel and the back light source;
  wherein the micro-lens array comprises a plurality of micro-lenses respectively corresponding to the plurality of display sub-regions;
  the plurality of first light sources are respectively approximately at focal points of the plurality of micro-lenses;
  the plurality of second light sources are respectively approximately at the focal points of the plurality of micro-lenses;
  wherein the method further comprises focusing back light provided by the plurality of first light sources by the plurality of micro-lenses respectively to the plurality of display sub-regions thereby displaying the plurality of first sub-images; and
  focusing back light provided by the plurality of second light sources by the plurality of micro-lenses respectively to the plurality of display sub-regions thereby displaying the plurality of second sub-images.

17. The method of claim 15, wherein the first time sequential order comprises:
  displaying one or multiple of the plurality of first sub-images but none of the plurality of second sub-images at a first time point; and
  displaying one or multiple of the plurality of second sub-images but none of the plurality of first sub-images at a second time point;
  wherein the second time sequential order comprises:
  illuminating one or multiple of the plurality of first light sources corresponding to the one or multiple of the plurality of first sub-images, but none of the plurality of second light sources at the first time point; and
  illuminating one or multiple of the plurality of second light sources corresponding to the one or multiple of the plurality of second sub-images, but none of the plurality of first light sources at a second time point.

18. The method of claim 15, wherein the first time sequential order comprises:
  displaying a combination of one or multiple of the plurality of first sub-images and one or multiple of the plurality of second sub-images at a first time point; and
  displaying a combination of one or multiple of the plurality of second sub-images and one or multiple of the plurality of first sub-images at a second time point;
  wherein the second time sequential order comprises:
  illuminating a combination of one or multiple of the plurality of first light sources corresponding to the one or multiple of the plurality of first sub-images, and one or multiple of the plurality of second light sources corresponding to the one or multiple of the plurality of second sub-images at the first time point; and
  illuminating a combination of one or multiple of the plurality of second light sources corresponding to the one or multiple of the plurality of second sub-images, and one or multiple of the plurality of first light sources corresponding to the one or multiple of the plurality of first sub-images at a second time point.

* * * * *